(12) United States Patent
Singh et al.

(10) Patent No.: US 10,228,931 B2
(45) Date of Patent: Mar. 12, 2019

(54) PERIPHERAL DEVICE SUPPORT WITH A DIGITAL ASSISTANT FOR OPERATING SYSTEM UPGRADES

(71) Applicant: Microsoft Technology Licensing, LLC, Redmond, WA (US)

(72) Inventors: Parmjeet Singh, Bellevue, WA (US); Lakshmi Narayana Mummidi, Bellevue, WA (US)

(73) Assignee: MICROSOFT TECHNOLOGY LICENSING, LLC, Redmond ( * ) Notice: Subject to any disclaimer, the term of this patent is extended or adjusted under 35 U.S.C. 154(b) by 76 days.

(21) Appl. No.: 15/345,246

(22) Filed: Nov. 7, 2016

(65) Prior Publication Data
US 2018/0129492 A1   May 10, 2018

(51) Int. Cl.
G06F 9/44       (2018.01)
G06F 8/65       (2018.01)
G06N 3/08       (2006.01)
G06F 9/445      (2018.01)

(52) U.S. Cl.
CPC .......... G06F 8/65 (2013.01); G06N 3/08 (2013.01)

(58) Field of Classification Search
None
See application file for complete search history.

(56) References Cited

U.S. PATENT DOCUMENTS 6,826,683 B1 * 11/2004 Suermondt ............... G06F 8/60
                                                       713/100
7,530,065 B1   5/2009  Ciudad et al.
7,594,219 B2   9/2009  Ramachandran et al.
8,010,959 B2   8/2011  Mullis, II et al.
8,688,866 B1   4/2014  Bhogal et al.
(Continued)

FOREIGN PATENT DOCUMENTS

CN          103530226 A  *  1/2014

OTHER PUBLICATIONS

Huculak, "How to prepare your PC for the Windows 10 Upgrade", www.Windowscentral.com, 2016.*
(Continued)

*Primary Examiner* — Hossain M Morshed
(74) *Attorney, Agent, or Firm* — Mark K. Young; Mayer & Williams PC

(57) ABSTRACT

A digital assistant supported across computing devices is configured to interact with an operating system (OS) upgrade system so that various user experiences, services, content, or features associated with support for peripheral devices during an OS upgrade of a computing device can be provided by the digital assistant and rendered as a native digital assistant user experience. The digital assistant is configured to surface a notification through a user interface (UI) when an OS upgrade is available for a user's computing device and recommended for installation. The OS upgrade system executes a confidence model in a machine learning system using real world crowd-sourced data to make predictions of successful post-upgrade operations of peripheral devices with an associated level of confidence. The digital assistant personalizes the OS upgrade notification to the user based on the configuration of computing and peripheral devices, applicable context, and the confidence level.

20 Claims, 25 Drawing Sheets

(56) References Cited

U.S. PATENT DOCUMENTS

| | | |
|---|---|---|
| 8,713,560 B2 | 4/2014 | Neumann et al. |
| 8,725,839 B2 | 5/2014 | Madduri et al. |
| 9,031,548 B2 | 5/2015 | Mao et al. |
| 9,128,797 B2 | 9/2015 | Zheng et al. |
| 9,354,902 B2 | 5/2016 | Kline et al. |
| 2004/0143828 A1 | 7/2004 | Liu et al. |
| 2006/0130042 A1* | 6/2006 | Dias ............... G06F 9/5083 717/168 |
| 2006/0168576 A1 | 7/2006 | Phung et al. |
| 2006/0224544 A1* | 10/2006 | Keith, Jr. ............ G06N 5/04 706/60 |
| 2007/0112723 A1* | 5/2007 | Alvarez ............. G06F 9/50 |
| 2014/0122387 A1* | 5/2014 | Chi ............... G06N 99/005 706/12 |
| 2017/0161642 A1* | 6/2017 | Faaborg ............ G06F 9/46 |
| 2017/0279978 A1* | 9/2017 | Osadchyy ........ H04N 1/00023 |
| 2017/0300966 A1* | 10/2017 | Dereszynski ...... G06Q 30/0254 |

OTHER PUBLICATIONS

Huculak, Mauro, "How to prepare your PC for the Windows 10 upgrade", Published on: Jul. 28, 2015 Available at: http://www.windowscentral.com/how-prepare-your-pc-windows-10-upgrade (11 pages).

\* cited by examiner

PERIPHERAL DEVICE SUPPORT WITH A DIGITAL ASSISTANT FOR OPERATING SYSTEM UPGRADES

BACKGROUND

Digital assistants can provide a variety of features for device users and can make it easier to interact with devices to perform tasks, get information, and stay connected with friends and colleagues using voice interactions and other inputs. Digital assistants are sometimes referred to as "intelligent personal assistants" or "virtual assistants."

SUMMARY

A digital assistant supported across computing devices such as smartphones, tablets, personal computers (PCs), wearable devices, game consoles, and the like is configured to interact with an operating system (OS) upgrade system so that various user experiences, services, content, or features associated with support for peripheral devices (e.g., printers, scanners, cameras, etc.) during an OS upgrade of a computing device can be provided by the digital assistant and rendered as a native digital assistant user experience. The digital assistant is configured to surface a notification through a user interface (UI) when an OS upgrade is available for a user's computing device and is recommended for installation. The OS upgrade system executes a confidence model in a machine learning system using real world crowd-sourced data to make predictions of successful post-upgrade operations of peripheral devices with an associated level of confidence. The digital assistant personalizes the OS upgrade notification to the user based on the configuration of computing and peripheral devices, applicable context, and the confidence level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
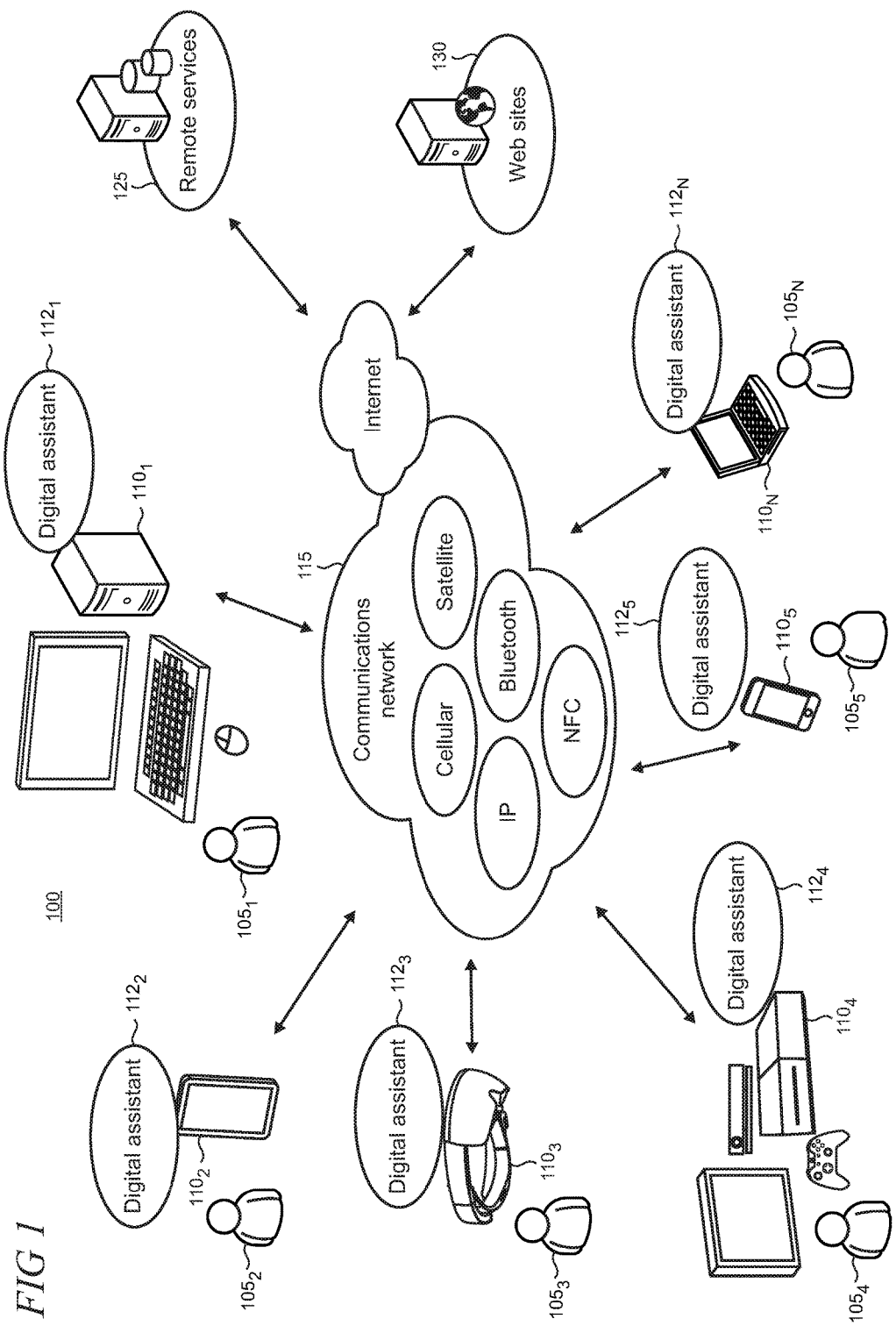
FIG. 1 shows an illustrative computing environment in which computing devices supporting a digital assistant can communicate and interact with various services and websites over a network.

A computing device typically relies on its operating system (OS) to provide critical functions such as managing hardware resources including the central processing unit (CPU), supporting a user interface (UI) for the device user, and executing and providing essential services to software applications. Like other software, an OS can become outdated and typically is subject to periodic upgrades and updates to provide new features and functions, fix bugs and other issues, and address security threats and vulnerabilities, among other things. Providers often release periodic updates to an OS that provide incremental changes to the software while reserving larger changes for OS upgrades. The term "upgrade" as used herein can refer to any OS release that provides changes to the previous version and can include both updates and upgrades as those terms are commonly used in the computing field.

Some computing device users may be reluctant to adopt an OS upgrade even when the upgrade provides desired features and benefits. Often such reluctance results from concern that some peripheral devices may not successfully operate after the OS upgrade is completed. Common problems that cause peripheral device failures after an OS upgrade include installation failures due to DNFs (peripheral device Driver Not Found), drivers being blocked from installation because they are known not to work post-upgrade, and failure of peripheral device manufacturers to provide updated drivers that are compatible with the new OS.

Peripheral device driver failures resulting from DNFs and blocking are typically conventionally handled using a static, pre-populated table that may be used by an OS provider to notify the computing device user that some peripheral devices may experience a loss of functionality or degraded functionality after an OS upgrade is completed. Such notifications not only provide limited information upon which the user can act, but they can often be inaccurate as the static table can quickly go out of date. In addition, the static table may not capture the full scope of all the various combinations of computing and peripheral device configurations that are in actual use which may result in inaccurate notifications or a failure to notify.

The lack of driver migration to the updated OS by peripheral device manufacturers is typically dealt with by published knowledge base articles that attempt to provide guidance and advice to users to solve peripheral device issues. However, as with the static table, knowledge base articles can go out of date and fail to have sufficient scope to fully cover the user population. In addition, many users are not inclined to research the knowledge base articles when troubleshooting problems with their computing devices, or the user may not have the technical knowledge and skills to understand the contents of the articles.

Because of these challenges to peripheral device success after OS upgrades, computing device users often seek out assistance from support and help resources provided by the OS and peripheral device suppliers such as telephone and online chat support. Such support can be costly for the suppliers and time consuming for the device users in many cases because of the difficulties in providing remote support due to lack of relevant background and context. For example, support personnel generally have limited information about the user's computing and peripheral configuration and it can be frustrating for the user to explain what is happening on her local machine with sufficient precision to enable the remote support personnel to provide a solution.

The challenges posed by peripheral devices for OS upgrades are addressed by the present digital assistant that is configured to maintain context awareness using device sensors and other device and user data to proactively participate and interact with the user to provide technical support for peripheral devices during an OS upgrade. With notice to the user and user consent, the digital assistant can observe the user's interactions and behaviors with the digital assistant, with other applications running on a computing device, and with peripheral devices to track and maintain awareness of context that is applicable to the user and/or computing device.

For example, the digital assistant can identify an appropriate context in which to notify the user of a suitable OS upgrade and provide recommendations as to whether an OS upgrade is installed based on a confidence level associated with one or more of the peripheral devices. If the confidence that post-OS upgrade operation success of a given peripheral device is below a threshold confidence that is explicitly set by the user or inferred from context by the OS upgrade system, then the digital assistant can refrain from recommending an OS upgrade. The OS upgrade system dynamically monitors the confidence level for that peripheral device over time, and then the digital assistant can surface the OS upgrade notification and recommendation when the confidence level in a successful OS upgrade exceeds the threshold.

In the event the confidence level remains low, or a known issue with OS upgrade success for a peripheral device is identified, then the digital assistant can proactively take steps and/or interact with the user to locate and implement effective mitigations, solutions, or workarounds for the problem. By leveraging knowledge of the user, relevant context, and its access to a large database of information, the digital assistant can take informed and intelligent steps to identify solutions and provide specific and contextually-relevant guidance to the user. For example, the digital assistant can recommend and/or run troubleshooters, collect and surface relevant information from remote knowledge bases, check for corrupted, outdated, missing, or damaged components, find patches and driver updates, and the like.

The OS upgrade system can be implemented using locally instantiated components including an OS upgrade client that interoperates with a remote OS upgrade service. The OS upgrade service may be incorporated into an existing digital assistant service in some implementations. The OS upgrade system can dynamically collect telemetry data associated with real world instances of OS upgrades crowd-sourced across a universe of users and devices. The real-world telemetry data may include parameters describing OS source, OS target, computing and peripheral device configuration (e.g., manufacturer, model, revision, etc.), device driver, peripheral connection type (e.g., USB (Universal Serial Bus), TCP (Transmission Control Protocol), UDP (User Datagram Protocol)), and upgrade success or failure. The OS upgrade system utilizes the collected telemetry data in a confidence model operated in a machine learning system to make a prediction with some confidence level for a successfully operating peripheral device for a given OS upgrade scenario.

The present peripheral device support with a digital assistant for OS upgrades provides an effective solution to the problem of uncertainty as to successful operation of peripheral devices after an OS upgrade by giving the user more comprehensive information that is specifically tailored to the user's circumstances and context. The solution has the effect of making the computing device more performant and secure as an informed user is more apt to perform the OS upgrade on the computing device. Use of the digital assistant also increases the efficiency of the human-machine interface between the user and the computing and peripheral devices by surfacing OS upgrade notifications at times when the user is likely to be receptive to them and provide contextually-relevant information about peripheral device success.

The automated and proactive steps taken by the OS upgrade system and digital assistant to provide solutions and workarounds in the event of peripheral device driver migration failure reduces the opportunity for user input errors. For example, the digital assistant's knowledge of device configuration and user history enables it to quickly locate appropriate and contextually-relevant resources. Such automated features provided by the digital assistant can also be expected to be more efficient than manual operations performed by a user which may be time consuming and prone to error. Such increased efficiency may enable the device to better utilize available computing resources including network bandwidth, processing cycles, memory, and battery life in some cases.

Turning now to the drawings, FIG. 1 shows an illustrative computing environment 100 in which the same or different users 105 may employ devices 110 that can communicate with other devices and various services over a network 115. Each device 110 may include an instance of a digital assistant 112. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth®-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), desktop PCs, multimedia consoles, gaming systems, or the like. In the discussion that follows, the use of the term "computing device" is intended to cover all devices that are configured with communication capabilities and are capable of connectivity to the network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

Accessory devices, such as wristbands and other wearable computing devices may also be present in the environment 100. Such accessory device typically is adapted to interoperate with a coupled device 110 using a short range communication protocol like Bluetooth® to support functions such as monitoring of the wearer's fitness and/or physiology (e.g., heart rate, steps taken, calories burned, etc.) and environmental conditions (temperature, humidity, ultra-violet (UV) levels, etc.), and surfacing notifications from the coupled device 110. Some accessory devices can be configured to work on a standalone basis (i.e., without relying on a coupled device 110 for functionality such as Internet connectivity) as wearable computing devices that may support an operating system and applications.

The devices 110 can typically utilize the network 115 to access and/or implement various user experiences. The network can include any of a variety of network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

The network 115 may utilize portions of the Internet or include interfaces that support a connection to the Internet so that the devices 110 can access content and render user experiences provided by various remote or cloud-based application services 125 and websites 130. The application services 125 and websites 130 can support a diversity of features, services, and user experiences such as social networking, mapping, news and information, entertainment, travel, productivity, finance, etc.

Figure 2:
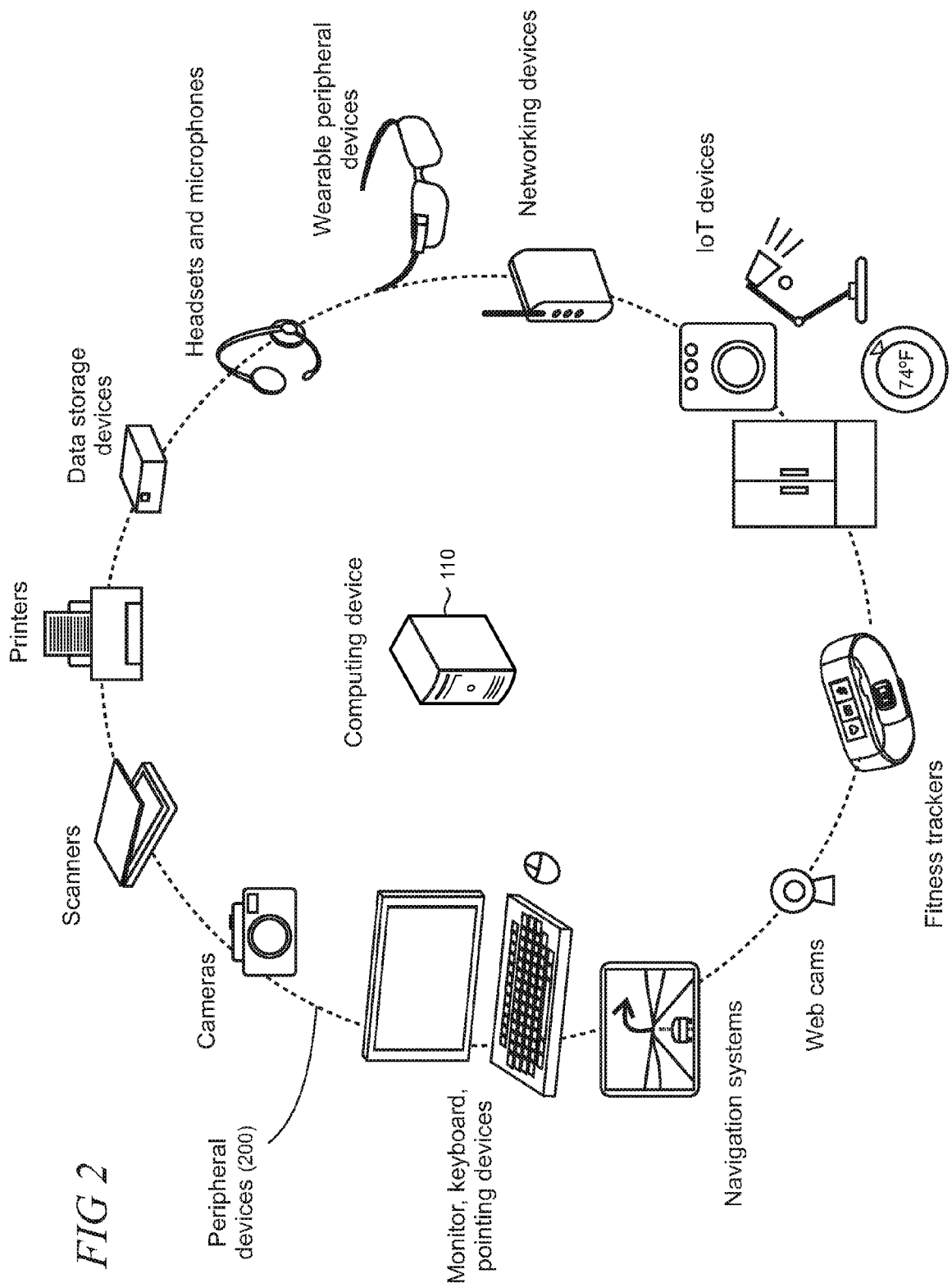
FIG. 2 shows illustrative peripheral devices that may interact with a computing device.

FIG. 2 shows illustrative peripheral devices, collectively identified by reference numeral 200, that may interact with a computing device 110. The peripheral devices include cameras, web cams, monitors, pointing devices (e.g., mouse, trackball, stylus), keyboards, optical scanners, data storage devices, headsets, microphones, networking devices (e.g., routers, modems, network interfaces, switches, etc.), fitness trackers and other wearable devices such as virtual reality and augmented reality glasses and HMD devices, navigation systems, and IoT (Internet of Things) devices such as smart appliances and home automation devices. The illustrated devices are exemplary and not an exhaustive presentation of all peripheral devices that can be supported by a digital assistant for OS upgrades. Peripheral devices can be produced in many different models by many manufacturers and provide a wide variety of features and capabilities.

The term "peripheral device" as used herein, refers to a tangible, hardware-based device that may be operatively coupled to a computing device but which does not directly contribute to the primary function of computing itself that is typically performed using one or more central processing units (CPUs) in a computing device 110. Thus, peripheral devices 200 often perform some auxiliary role to enhance computing functionality and/or enable users to use and access features and capabilities of the computing device 110. Many peripheral devices can act as accessories for the computing device, since the computing device is generally still able to perform its normal functions without the peripheral device. Other peripheral devices, such as the monitor and networking interfaces, are often essential for the user to be able to use the computing device.

Some peripheral devices 200 such as digital cameras and navigation systems can provide at least some functionality independently and apart from the computing device 110, while other peripheral devices, such as a mouse, can only be used in conjunction with a computing device. In some cases, a given device can be either or both a peripheral device and a computing device. A smartphone, for example, can be utilized as a computing device in one context and a peripheral device in other contexts. The smartphone can be considered a computing device that is operatively coupled to a peripheral Bluetooth® headset device. The smartphone can be viewed as a peripheral device when operatively coupled to a laptop computing device to upload digital photos captured by the smartphone's built-in camera.

Peripheral devices 200 can be operatively coupled to a computing device 110 either wirelessly using Bluetooth® or Wi-Fi or using a wired connection such as USB (Universal Serial Bus), PCI (Peripheral Component Interconnect), and ISA (Industry Standard Architecture). Peripheral devices 200 can be directly coupled to a computing device 110 or coupled using networking infrastructure. For example, a printer can be coupled to a PC using a USB cable or over a local area network using Ethernet or Wi-Fi. Some peripheral devices 200, such as compact disc drives and networking interface cards, are located inside the computing device 110, while other peripheral devices are external to the computing device.

Figure 3:
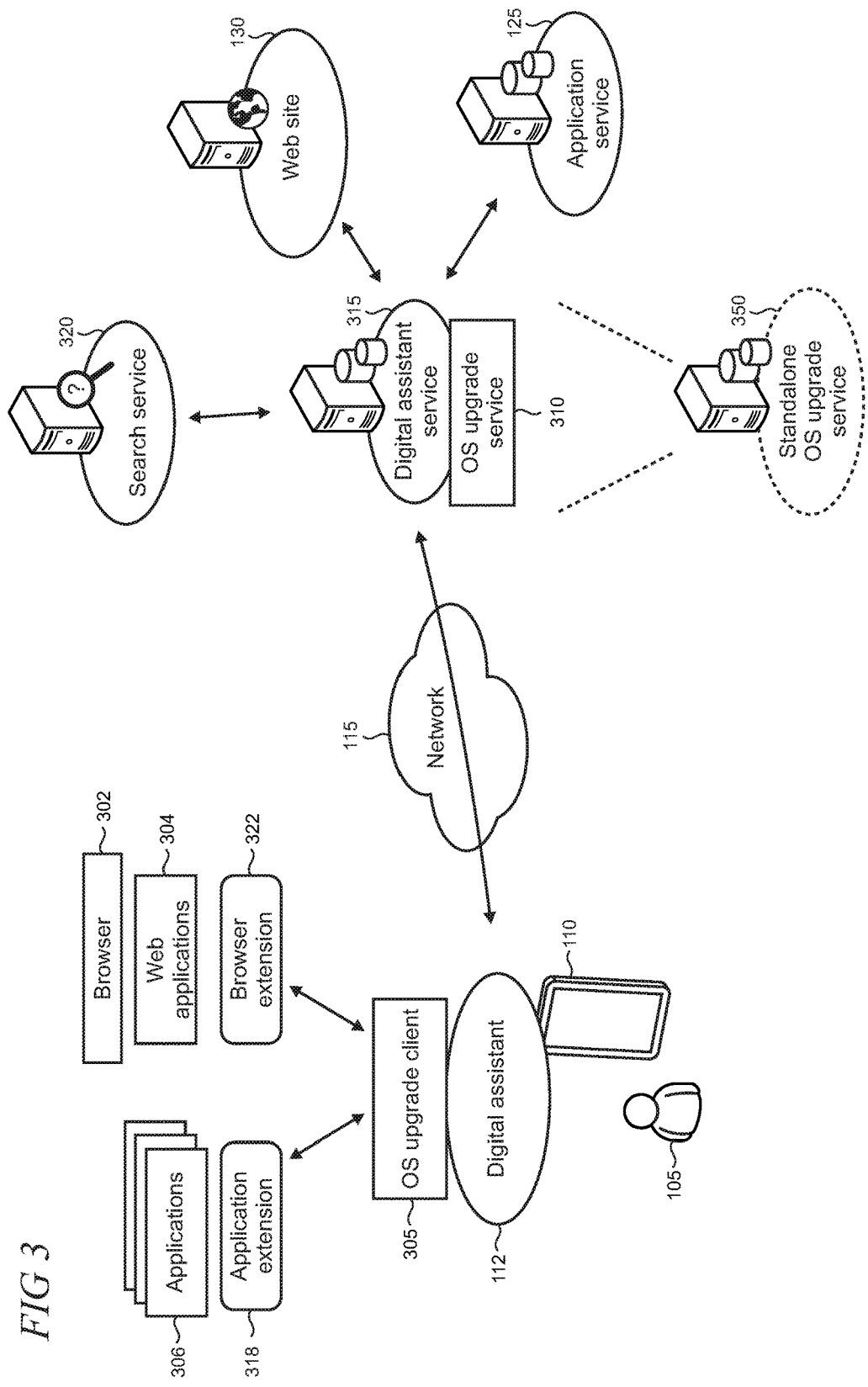
FIG. 3 shows a local operating system (OS) upgrade client interacting with a remote OS upgrade service.

As shown in FIG. 3, a device 110 can include local components such as a browser 302 into which web applications 304 can render and/or one or more applications 306 that can facilitate interaction with one or more websites 130 and remote application services 125. For example, in some use scenarios, a user 105 may launch a locally executing application that communicates over the network 115 to an application service 125 to retrieve data and obtain services to enable various features and functions, provide information, and/or support user experiences that can be supported on various ones of the user interfaces on a local device 110 such as GUIs and audio user interfaces. In some use scenarios and/or at different times, an application 306 may operate locally on the device without needing to interface with a remote service.

The local digital assistant 112 interoperates in this illustrative example with a local OS upgrade client 305 that typically communicates over the network 115 with a remote OS upgrade service 310 that is supported by the remote digital assistant service 315. As described in more detail in the text accompanying FIG. 14, the OS upgrade client and service are collectively referred to as an OS upgrade system. In this particular example, the OS upgrade client 305 is configured to interact with the digital assistant 112, and the OS upgrade service 310 is supported by the digital assistant service 315. However, the OS upgrade client can be separately instantiated from the digital assistant in some cases. In addition, the OS upgrade service may be optionally provided in whole or part (as indicated by the dashed lines) by a standalone service 350 or be incorporated into another service.

The OS upgrade client and/or digital assistant may interact with applications through one or more application extensions 318 or other suitable interface to enable application context, content, and user experiences to be accessed by the OS upgrade client and/or the digital assistant. Similarly, the OS upgrade client and/or the digital assistant may interact with the browser 302 and web applications 304 through a browser extension 322 or other suitable interface to enable web application context, content, and user experiences to be accessed by the OS upgrade client and/or the digital assistant.

In some implementations, the OS upgrade client 305 can be arranged as a standalone component that provides features and/or services without interacting with a remote resource or service (aside from periodic updates, and the like). Typically, the interoperability between the OS upgrade system and the digital assistant is implemented so that the system can render user experiences, features, and content using the digital assistant with a similar and consistent sound, look, and feel in most cases so that transitions between the system and the digital assistant are handled smoothly and the experiences are rendered seamlessly to the user. In some cases, as described below, the digital assistant service 315 may interact with external search services 320 as well as websites 130 and application services 125 as may be appropriate to provide support and information for a peripheral device in an OS upgrade.

Figure 6:
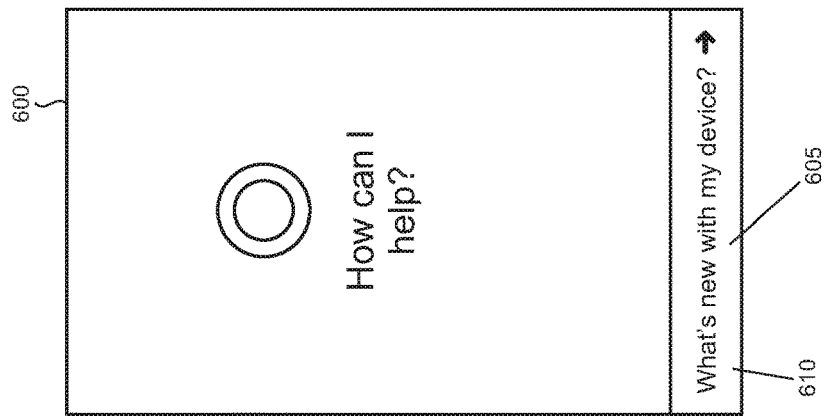
FIGS. 4, 5, and 6 show screen captures of illustrative graphical user interfaces (GUIs) that are exposed on a device by a digital assistant.
Figure 5:
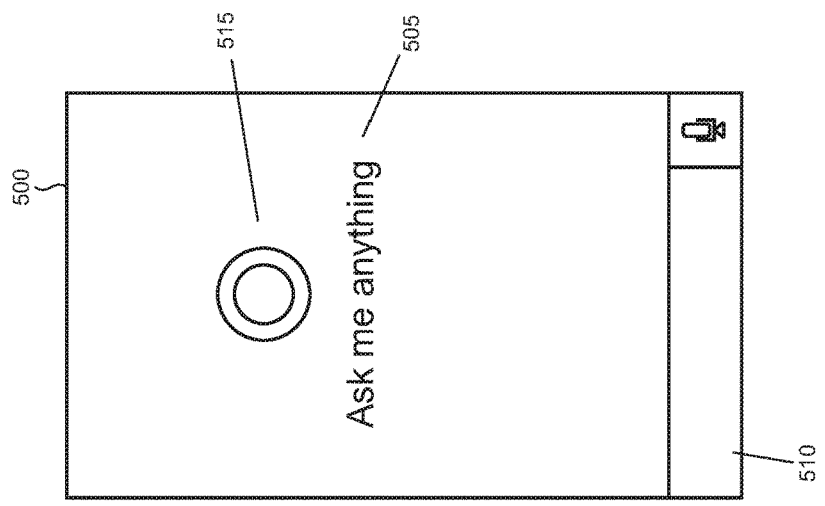
Figure 4:
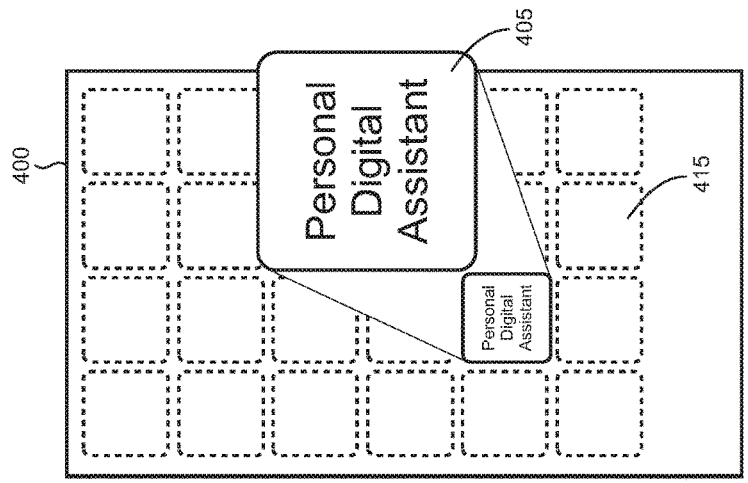

An instance of the digital assistant 112 on a device 110 can be exposed to the user 105 through a graphical user interface (GUI) that is displayed on a device 110. For example, FIGS. 4, 5, and 6 show various illustrative screen captures of GUIs that may be utilized in the present peripheral device support with a digital assistant. It is noted that the particular GUIs displayed in the drawings can vary from what are shown according to the needs of a particular implementation. GUI 400 in FIG. 4 shows a personal digital assistant application represented by a tile 405 that is displayed along with tiles representing other applications, features, functions, or user experiences (representatively indicated by reference numeral 415) on a start screen of a device 110. Examples of digital assistants that are currently available for computing devices include Cortana® by Microsoft Corporation, Siri® by Apple Inc., Google Now™ and Google Assistant, and Alexa™ by Amazon.com, Inc.

The digital assistant 112 may also be configured to be launched from any location within any GUI or other type of user interface on the device 110, or from within any current user experience. For example, the user 105 can be on a phone call, browsing the web, watching a video, or listening to music, and simultaneously launch the digital assistant from within any of those experiences. In some cases, the digital assistant can be invoked or launched through manipulation of a physical or virtual user control, and/or by voice control/command and/or sensed gesture in other cases.

The digital assistant 112 may also be configured to work across one or more devices 110 that are associated with a user 105. For example, a user can start a conversation with the digital assistant running on her laptop computer, and then finish the conversation with the digital assistant.

When the user invokes the digital assistant, for example, by touching the tile 405 or by invoking a voice command or gesture, a UI 500 shown in FIG. 5 is displayed on the device 110 that includes a text string 505 that asks the user if something is needed. In alternative implementations, text to voice translation can be employed so that an audio message can be played in place of, or to supplement the text string 505. As shown, the GUI includes a box 510 that is configured for showing a textual representation of a received voice command/control or other user input.

One or more graphic objects 515 can be displayed on the UI 500 to represent the digital assistant to the user. The graphic object 515 in this example is a circular shape that can be animated so that, for example, it changes its shape, color, transparency, motion, or appearance as the digital assistant performs tasks, provides information, interacts with the user, etc.

As shown in the UI 600 in FIG. 6, the user has input the string "What's new with my device" 605 into the box 610 using, for example, keypad input on a physical or virtual keypad, gesture, or voice. The input provides one way to launch the digital assistant to provide information and support for peripheral devices with OS upgrades, as described in the illustrative user experiences below. In some implementations, the digital assistant can be invoked by name, for example, "Cortana, please open the last spreadsheet I was working on last night."

Figure 7:
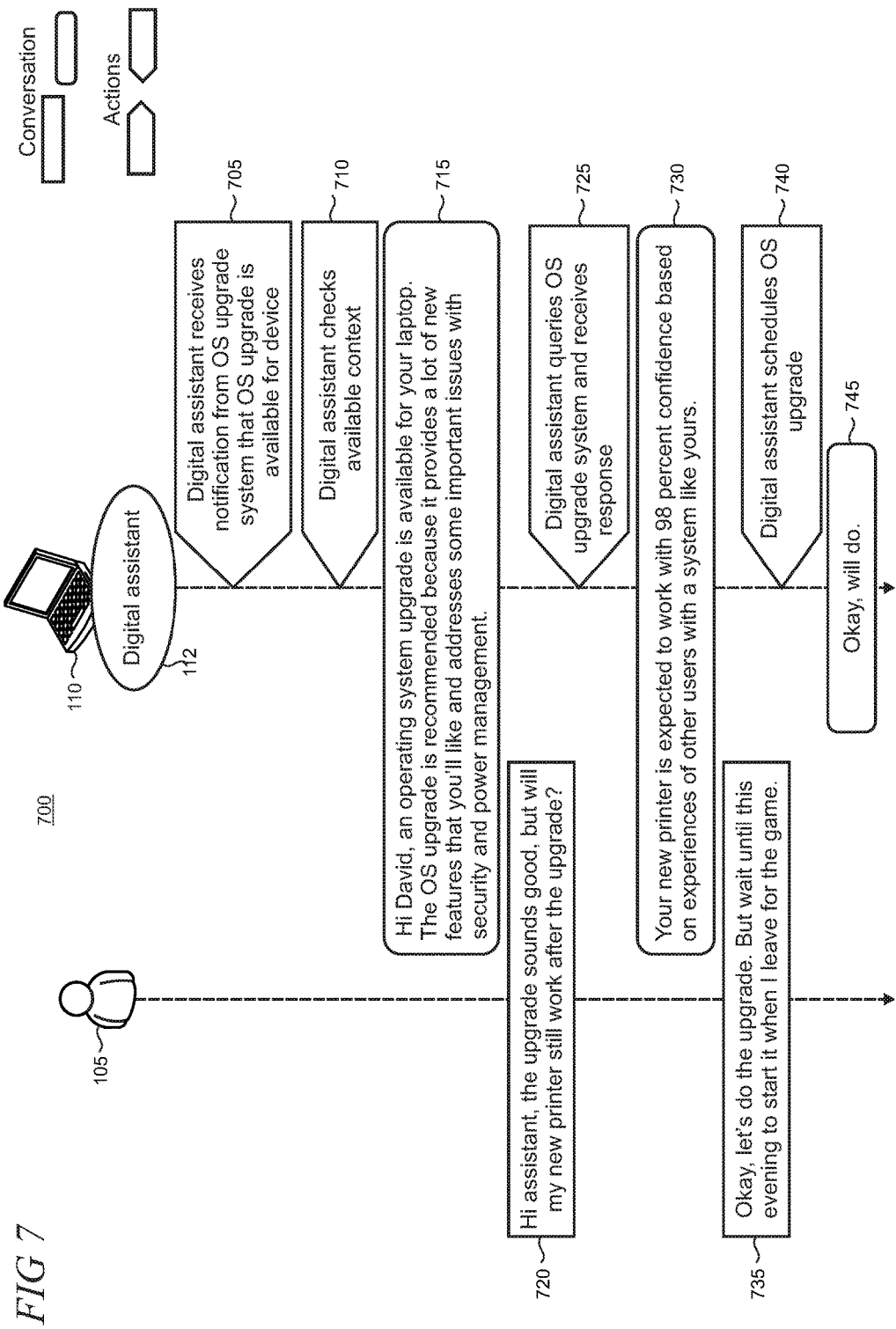
FIGS. 7, 8, 9, and 10 show transcripts of illustrative user experiences with a digital assistant.

FIGS. 7, 8, 9, and 10 show transcripts of illustrative user experiences with a digital assistant that deal with peripheral device support for OS upgrades. FIG. 7 shows a transcript 700 of a first illustrative user experience with a digital assistant. In the transcripts that follow, conversation between the user 105 and the digital assistant are indicated by blocks and actions are indicated by flags. In this user experience, the digital assistant 112 receives a notification at flag 705 from the OS upgrade system that an OS upgrade is available for one of the user's devices 110. As described in more detail in the text accompanying FIG. 14, the OS upgrade system may comprise the local OS upgrade client and/or the remote service. In this example, the notification was pushed from the OS upgrade system, but in other cases the digital assistant can proactively query the system to determine status for OS upgrade eligibility, either from time to time, or in response to an occurrence of an event or other context.

At flag 710, the digital assistant checks available context pertaining to the user 105 and/or the device 110 to determine whether attendant circumstances warrant surfacing the notification to the user. For example, the digital assistant can examine the user's current location from device sensor data and mapping application as well as the user's schedule from a schedule or calendar application to identify a suitable opportunity to surface the notification. Data from device sensors that indicate the user's energy level, activity level, or mood may provide relevant context in some cases. The digital assistant may also consider device state to provide relevant context. For example, the device state may indicate that the user is on a phone call, or using data for web surfing, texting, or video consumption, etc.

The digital assistant can also track user behaviors and interactions with the device (typically with notice to the user and user consent) to establish a user history. The user history may also provide relevant context with which to identify an appropriate time or context for surfacing the notification. For example, the user history may indicate that the user tends to pay attention to notifications pertaining to the device and device operations that are surfaced at times between meetings and not during phone calls or texting sessions. Preferences that are explicitly expressed by the user may also provide relevant context for the digital assistant to surface the notification.

When the available context indicates an opportunity to surface the notification to the user, the digital assistant informs the user of the availability of an OS upgrade at block 715. In this illustrative example, the notification is performed using audio, but graphics may also be used to supplement the audio, or be used instead of audio in some cases. The notification includes a recommendation that the user perform the OS upgrade. At block 720, the user 105 asks the digital assistant 112 about a specific peripheral device (i.e., a printer). The digital assistant queries the OS upgrade system to receive a level of confidence that the specified peripheral device will successfully work after the OS upgrade is complete at flag 725 and reports the confidence to the user at block 730.

In alternative use scenarios, the OS upgrade system can include a package of information with the OS upgrade availability notification that describes confidences for each of the user's peripheral devices. In such cases, the digital assistant can monitor the peripheral devices that have been used with the user's computing devices and supply the monitoring data to the OS upgrade system. The data can be supplemented periodically so that the OS upgrade system maintains a manifest of current peripheral devices. In some cases, the frequency of peripheral device use can be included in the monitoring. In this way, peripheral devices that are infrequently used can be excluded from consideration by the OS upgrade system or be given less weight when making an OS upgrade recommendation or providing OS upgrade information.

When the user requests that the OS upgrade be performed at a particular time at block 735, the digital assistant schedules the OS upgrade for installation at flag 740. The digital assistant verbally acknowledges the user at block 745.

Figure 8:
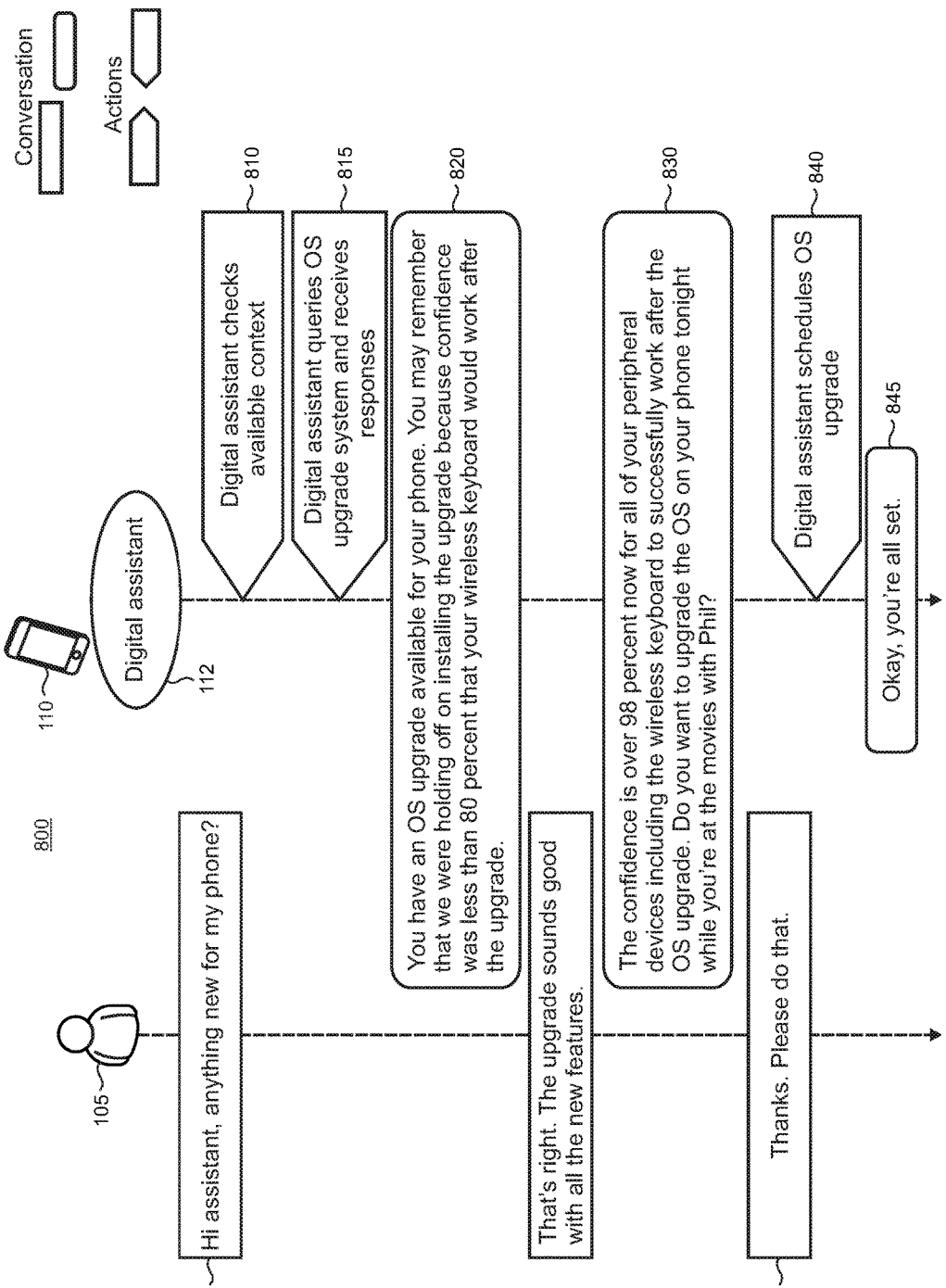

FIG. 8 shows a transcript 800 of a second illustrative user experience with a digital assistant. In this example, the user 105 asks the digital assistant 112 for new developments for her computing device 110 (e.g., a smartphone) at block 805. The digital assistant checks available context such as user history at flag 810 to recognize that a conversation about an OS upgrade had occurred in the past. At flag 815, the digital assistant queries the OS upgrade system to obtain the latest status and receives responses.

At block 820, the digital assistant provides the user with a recap of the earlier conversation and provides the current status for the user's peripheral device at block 830. Available context from the user's scheduling or calendar application enables the digital assistant to know that the user will not be using the computing device 110 later that day and suggests that the OS upgrade be installed then. The user provides her assent at block 835 and the digital assistant schedules the OS upgrade for installation at flag 840. The digital assistant verbally acknowledges the user at block 845.

Figure 9:
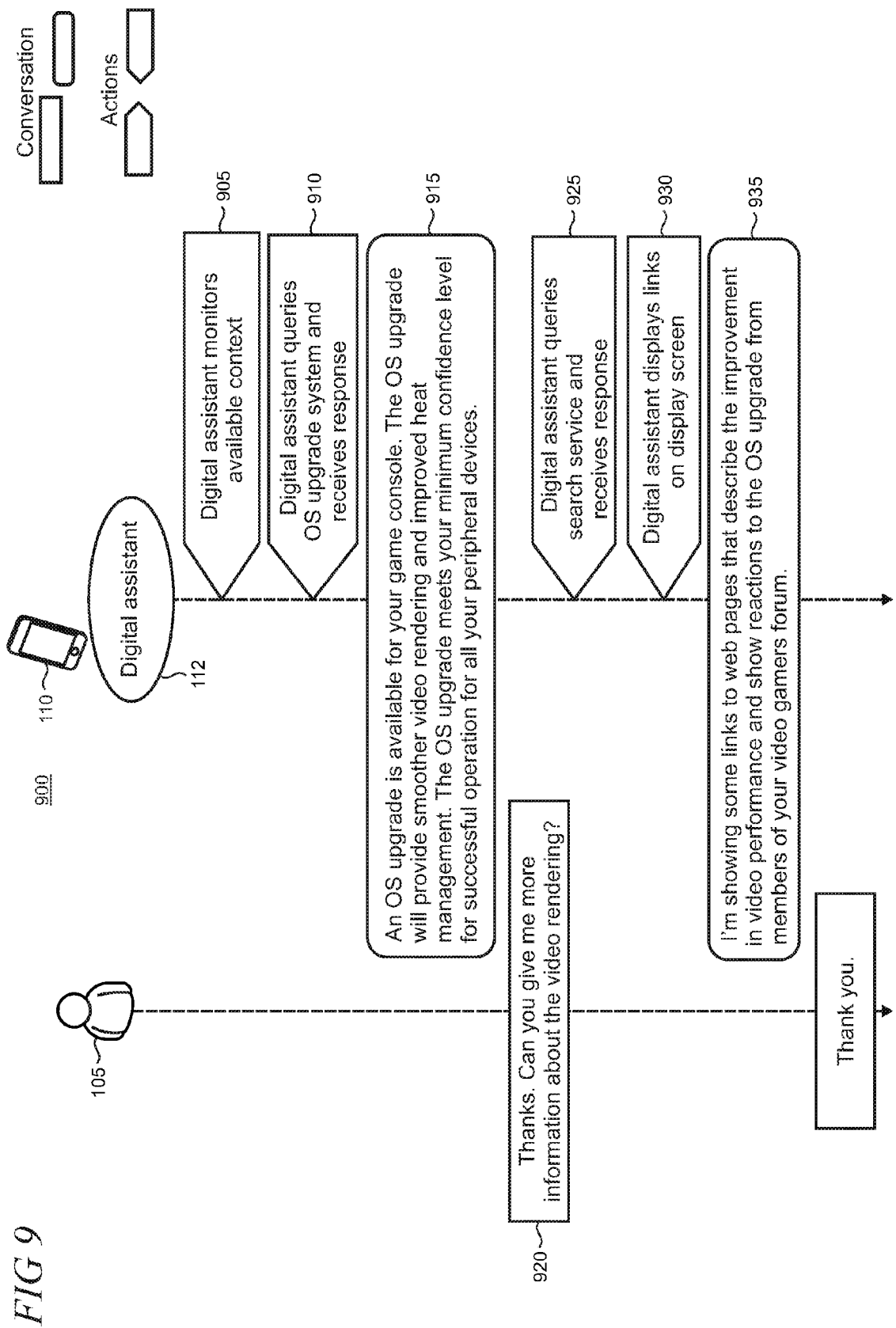

FIG. 9 shows a transcript 900 of a third illustrative user experience with a digital assistant. In this example, the digital assistant 112 operates proactively to identify OS upgrade opportunities for the user's computing devices 110 and provide notifications to the user 105. At flags 905 and 910 respectively, the digital assistant monitors available context and queries the OS upgrade system for status. When the digital assistant determines that an OS upgrade is available that meets the user's expectations, it surfaces an audio notification at block 915.

In this example, the digital assistant has determined that an available OS upgrade meets the user's minimum expectations for confidence that peripheral devices will successfully operate after the OS upgrade is completed. The digital assistant may use past conversations with the user to provide the contextual background to support a recommendation, or it may make inferences based on other context such as user behaviors and interactions, contextual data from applications, and the like.

For example, the user may have agreed to an OS upgrade for other computing devices when confidence for successful peripheral operations reached a certain level and the digital assistant can use that past user agreement as a factor in the decision to recommend the current OS upgrade. Alternatively, the user may have explicitly stated a desired confidence level for one or more peripheral devices be met before undertaking an OS upgrade in a previous conversation with the digital assistant. In some cases, the digital assistant can make inferences as to the user's expectations by examining behaviors of other users who have similar profiles or user histories.

At block 920, the user 105 requests additional information relating to the OS upgrade from the digital assistant 112. In response to the user's request, the digital assistant can formulate a query to a search service 320 (FIG. 3) at flag 925 and receives a response. The digital assistant can render the retrieved information responsively to the request, for example, by displaying links to web sites as shown at flag 930, or by reading the information to the user. The digital assistant informs the user at block 935 that relevant information is available for review.

Figure 10:
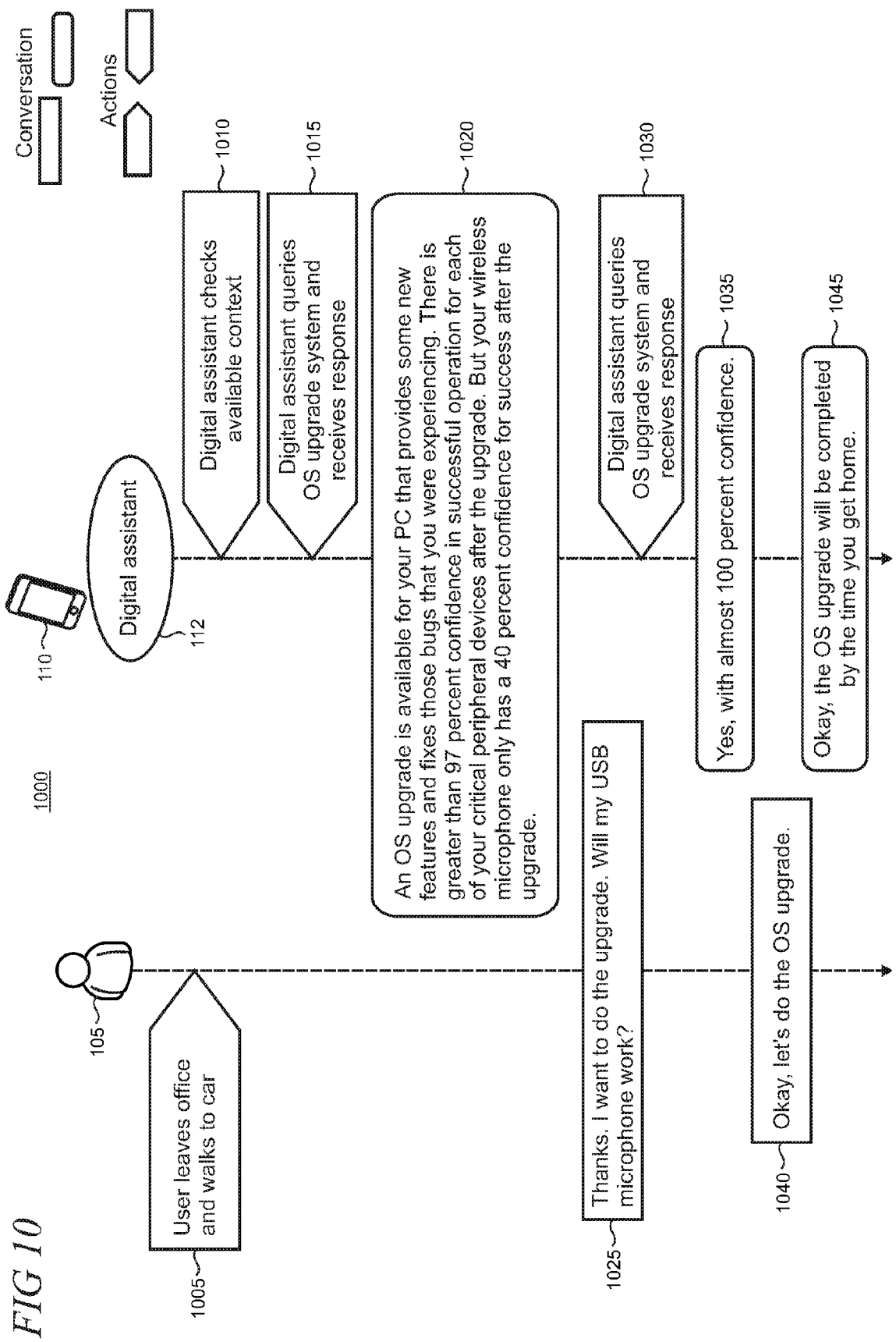

FIG. 10 shows a transcript 1000 of a fourth illustrative user experience with a digital assistant. At flag 1005, the user 105 leaves her office and walks to her car. At flag 1010, the digital assistant 112 proactively checks available context and determines that the user movement (as detected by sensors in the computing device 110), time of day, and past user behaviors indicates that the user is heading home from work and is likely amenable to receive a notification about an OS upgrade. At flag 1015, the digital assistant queries the OS upgrade system for upgrade availability for her computing device (in this example, the user's desktop PC) and confidence levels for the peripheral devices that the digital assistant has determined from context monitoring and user history are utilized by the user with her desktop PC.

In this example, the digital assistant 112 receives information from the OS upgrade system that indicates a mix of confidence levels across the user's peripheral devices for her laptop. The OS upgrade system can distinguish between critical peripheral devices and non-critical peripheral devices. Critical peripheral devices are those which need to function to enable basic computing functionality and can include, for example, display adapters, network interfaces, and the like. Non-critical peripheral devices are those which are not needed to function to enable basic computing functionality and can include, for example, audio input and output components.

For example, critical peripheral devices need to operate for the computing device to boot up and support enough user interaction to use the computing device for its fundamental computing purposes and/or perform troubleshooting and repair. Non-operating non-critical peripheral devices can result in less functionality for the computing device and may cause the user some degree of inconvenience, but they do not frustrate fundamental computing purposes.

The digital assistant 112 reports the mixed confidence levels for post-upgrade success of the user's peripheral device at block 1020 and notes that the user's wireless microphone has low confidence for success. In response, at block 1025, the user follows up with a question regarding an alternative peripheral device, here, a USB microphone. The digital assistant formulates a query to an OS upgrade system at flag 1030 regarding the USB microphone and receives a response. At block 1035, the digital assistant informs the user 105 that the USB microphone is very likely to work successfully after the OS upgrade. The user agrees to the OS upgrade at block 1040. At block 1045, the digital assistant lets the user know when the upgrade will be completed.

Figure 11:
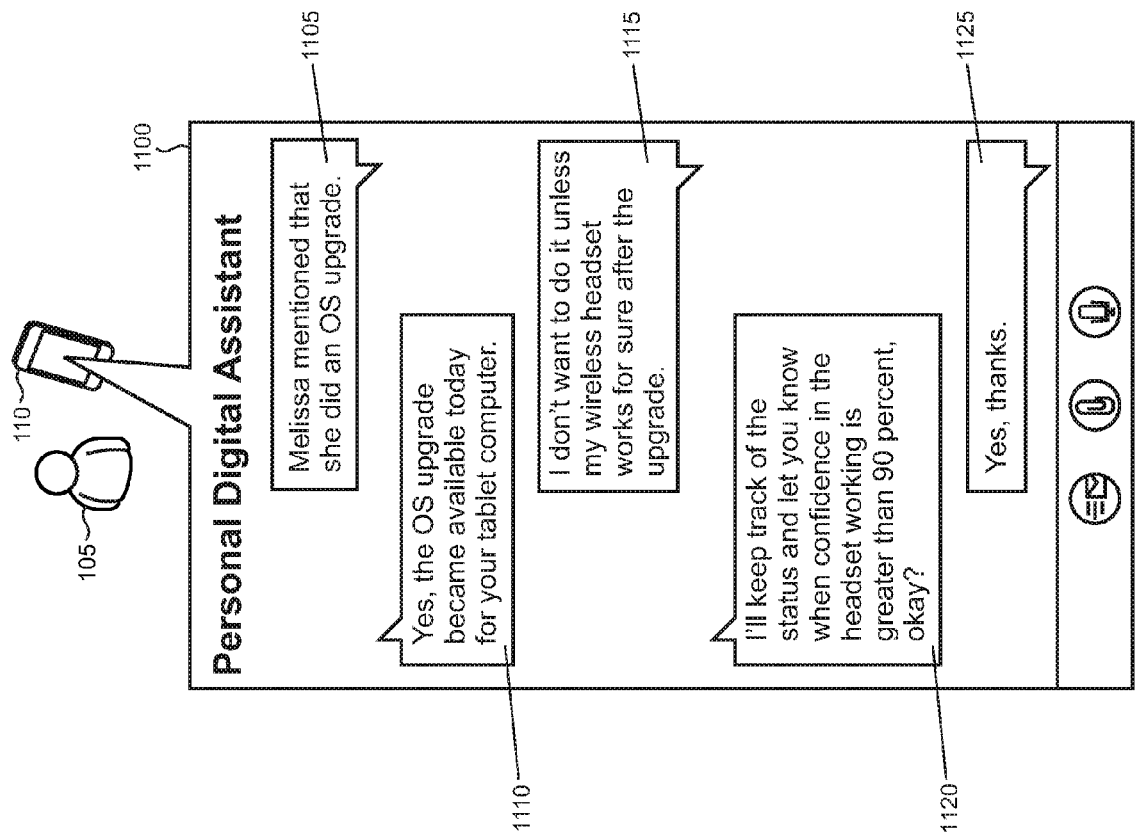
FIGS. 11 and 12 depict illustrative GUIs rendered on a computing device that show interactions between a device user and a digital assistant.

FIG. 11 shows an illustrative GUI 1100 rendered on a computing device 110 that shows interactions between the device user 105 and the digital assistant 112 pertaining to peripheral device support for OS upgrades. In this example, the user interacts with the digital assistant using text messages as if the digital assistant were a regular human contact of the user. The user's texts are shown on the right side of the GUI and the texts generated by the digital assistant are shown on the left side.

The user enters a text message 1105 saying that her friend mentioned that she did an OS upgrade. Using available context such as the user's contact list and past messaging history, and making queries to the search service 320 (FIG. 3) and OS upgrade system, the digital assistant can identify the user's friend and determine that she is referring to an OS upgrade that is available for the user's tablet computing device. At text message 1110, the digital assistant informs the user of the available OS upgrade.

In text message 1115, the user expresses an explicit preference to the digital assistant about her wireless headset peripheral device. In text message 1120, the digital assistant suggests a target confidence level for the peripheral device with the user. In text message 1125, the user agrees with the digital assistant's suggestion. The digital assistant can periodically query the OS upgrade system for confidence level status for the user's wireless headset peripheral device. When the confidence level meets the target, the digital assistant can provide a notification to the user with a recommendation to perform the OS upgrade on the user's tablet.

Figure 12:
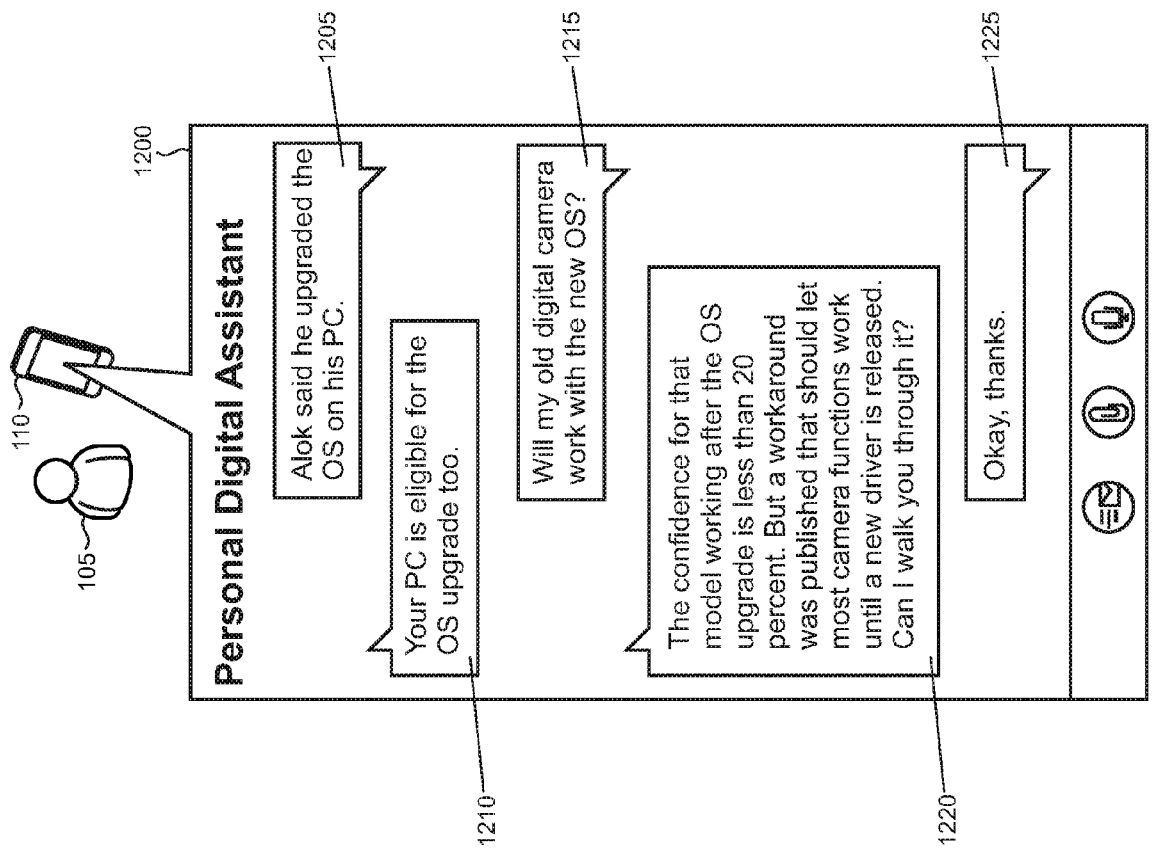

FIG. 12 shows an illustrative GUI 1200 rendered on a computing device 110 that shows text message interactions between the device user 105 and the digital assistant 112 pertaining to peripheral device support for OS upgrades. As with the illustrative example discussed above, the user and the digital assistant converse using text messages 1205 and 1210 about an available OS upgrade. The user asks about a specific peripheral device working after the OS upgrade is performed in text message 1215.

In this example, when the digital assistant queries the OS upgrade system, it learns that the confidence in success of the peripheral properly working is low. In response, the digital assistant can interact with one or more of the search service 320 (FIG. 3), websites 130, and application services 125 (FIG. 1) to locate information and solutions that are pertinent to the user's digital camera peripheral device. For example, the digital assistant can collect and synthesize information from various sources such as knowledge bases, technical forums, and the like.

As the digital assistant continuously maintains awareness of context, it has accurate and up to date knowledge of the user's computing and peripheral device configuration. The digital assistant can use this knowledge to locate information that is relevant to solving issues for the user. In this example, the digital assistant identifies a workaround for the digital camera that enables it to temporarily work (for example, with a modified feature set) with the upgraded OS until the camera manufacturer issues an updated driver. The digital assistant offers to explain to the user at text message 1220. When the user agrees in text message 1225, the digital assistant can use graphics and/or audio to walk the user through the identified workaround for the user's digital camera peripheral device.

Figure 13:
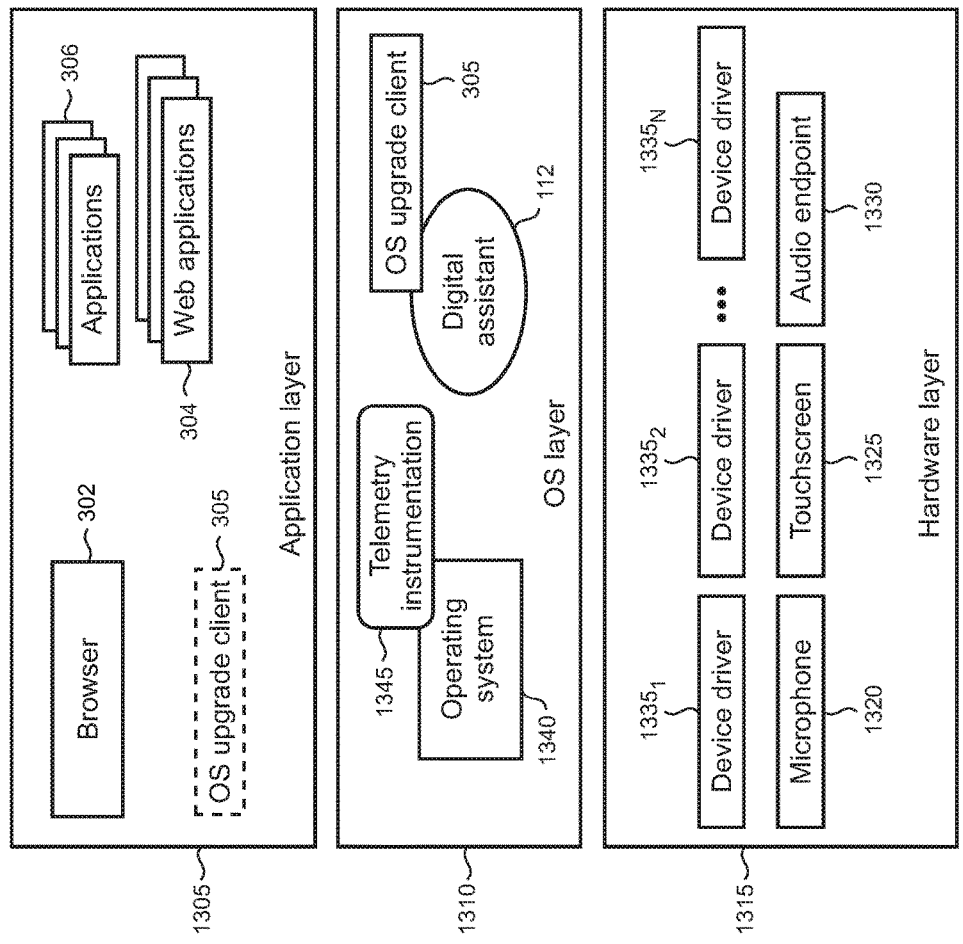
FIG. 13 shows an illustrative layered architecture.

Turning now to various implementation details for the present peripheral device support with a digital assistant for OS upgrades, FIG. 13 shows an illustrative layered architecture 1300 that may be instantiated on a given device 110. The architecture 1300 is typically implemented in software, although combinations of software, firmware, and/or hardware may also be utilized in some cases. The architecture 1300 is arranged in layers and includes an application layer 1305, an OS layer 1310, and a hardware layer 1315. The hardware layer 1315 provides an abstraction of the various hardware used by the device 110 (e.g., input and output devices, networking and radio hardware, etc.) to the layers above it. In this illustrative example, the hardware layer supports a microphone 1320, touchscreen 1325 (or other user input devices), and an audio endpoint 1330 which may include, for example, the device's internal speaker, a wired or wireless headset/earpiece, external speaker/device, and the like. Such hardware components can support user interactions with the digital assistant 112. Various peripheral device drivers 1335 are also supported in the hardware layer 1315.

The application layer 1305 in this illustrative example supports the browser 302 and various applications 306 and web applications 304 (e.g., productivity, social, entertainment, news and information applications, etc.). As noted above in the text accompanying FIG. 3, the browser and each of the applications may be configured to expose an extensibility functionality through respective application extensions and a browser extension (not shown in FIG. 13) such as an API (application programming interface), or other suitable components to facilitate interactions with the digital assistant 112, OS upgrade client 305, and other components in the OS layer 1310. For example, the extensibility functionality may enable the digital assistant to check the user's schedule for available context and/or access an email application to retrieve the user's emails and read them aloud to the user. The applications are often implemented using locally executing code. However, in some cases, these applications can rely on services and/or remote code execution provided by remote servers or other computing platforms such as those supported by a service provider or other cloud-based resources.

The OS layer 1310 supports the digital assistant 112, the OS upgrade client 305, and the device OS 1340. In alternative implementations, the OS upgrade client 305 can be optionally instantiated as components in the application layer 1305. In typical implementations, the local digital assistant can interact with the remote digital assistant service 315 (FIG. 3). That is, the digital assistant in some implementations can partially utilize or fully utilize remote code execution supported at the service 315, or using other remote resources.

The operating system 1340 supports telemetry instrumentation 1345 that is configured to report telemetry data to one or more remote services that monitor OS upgrades. The telemetry data may describe various characteristics about the device 110 such as the type of hardware being utilized, installed applications and usage, and peripheral device driver performance. The telemetry data is also utilized by a machine learning system used by the OS upgrade service as described below in the text accompanying FIG. 15.

The digital assistant 112 may utilize and/or interact with the other OS 1340 (and/or other components that are instantiated in the architecture 1300) as may be needed to implement the various features and functions described herein. In some implementations, some or all of the functionalities supported by one or more of the OS upgrade client 305, telemetry instrumentation 1345, application extensions and/or the browser extension can be directly incorporated into the digital assistant 112 and the particular division of functionality between the components in the architecture 1300 can be selected as a matter of design choice.

Figure 14:
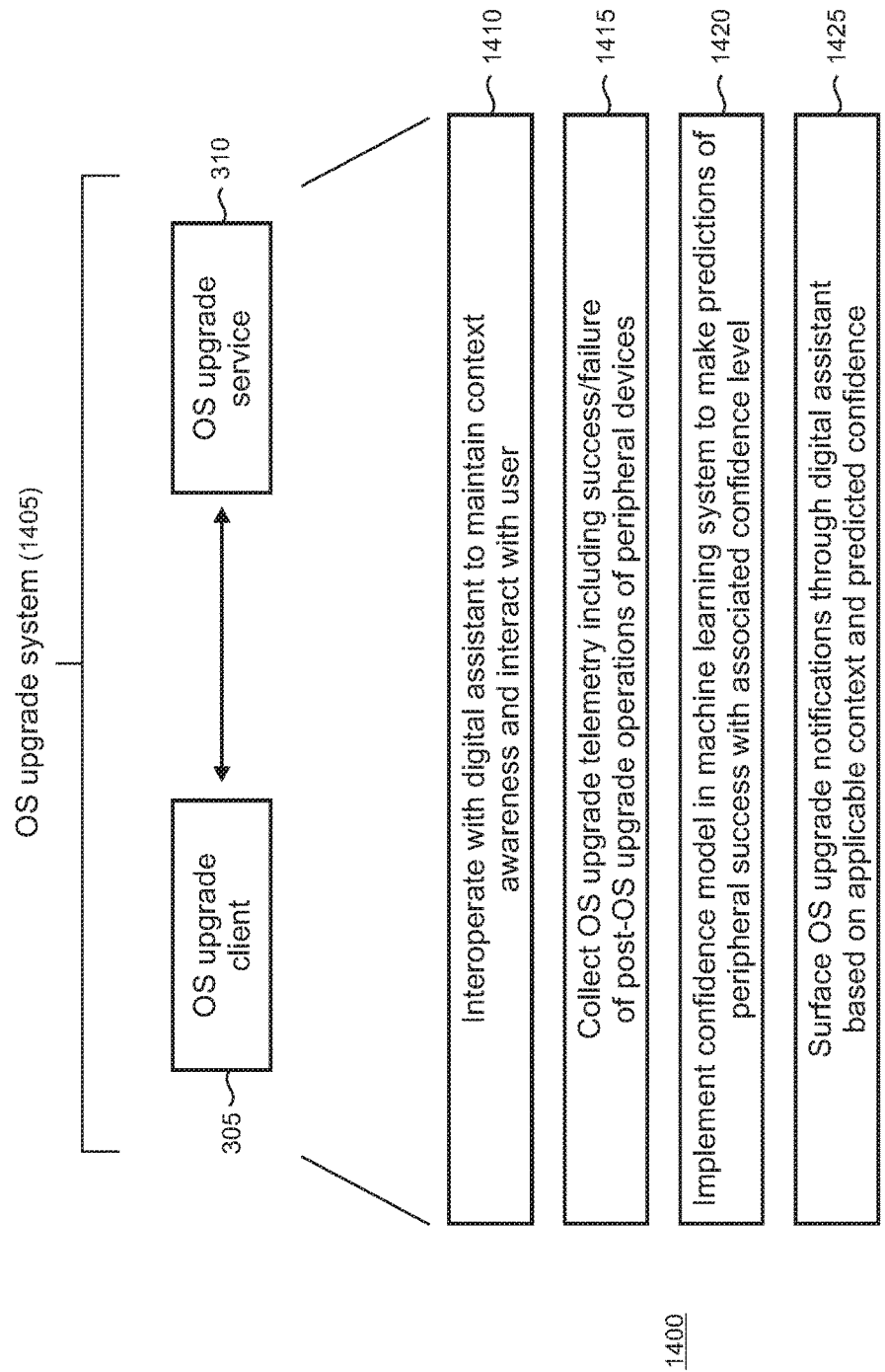
FIG. 14 shows illustrative functions that may be performed by an OS upgrade system.

The OS upgrade client 305 and OS upgrade service 310 are collectively referred to herein as an OS upgrade system 1405, as shown in FIG. 14. The OS upgrade system 1405 can expose a variety of features and capabilities according to the requirements of a particular implementation of the present peripheral device support with a digital assistant. For example, as shown in taxonomy of functions 1400, the OS upgrade system can interact with the user through the digital assistant (as indicated by reference numeral 1410); collect OS upgrade telemetry that includes data describing success and failures of post-OS upgrade operations of peripheral devices (1415); implement a confidence model in a machine learning system to make predictions of peripheral device success, in which the predictions have an associated level of confidence (1420); and surface notifications to the user through the digital assistant based on available context and the predicted confidence (1425). The functions 1400 are illustrative and not all the functions need to be performed by the OS upgrade system 1405 in every implementation.

Figure 15:
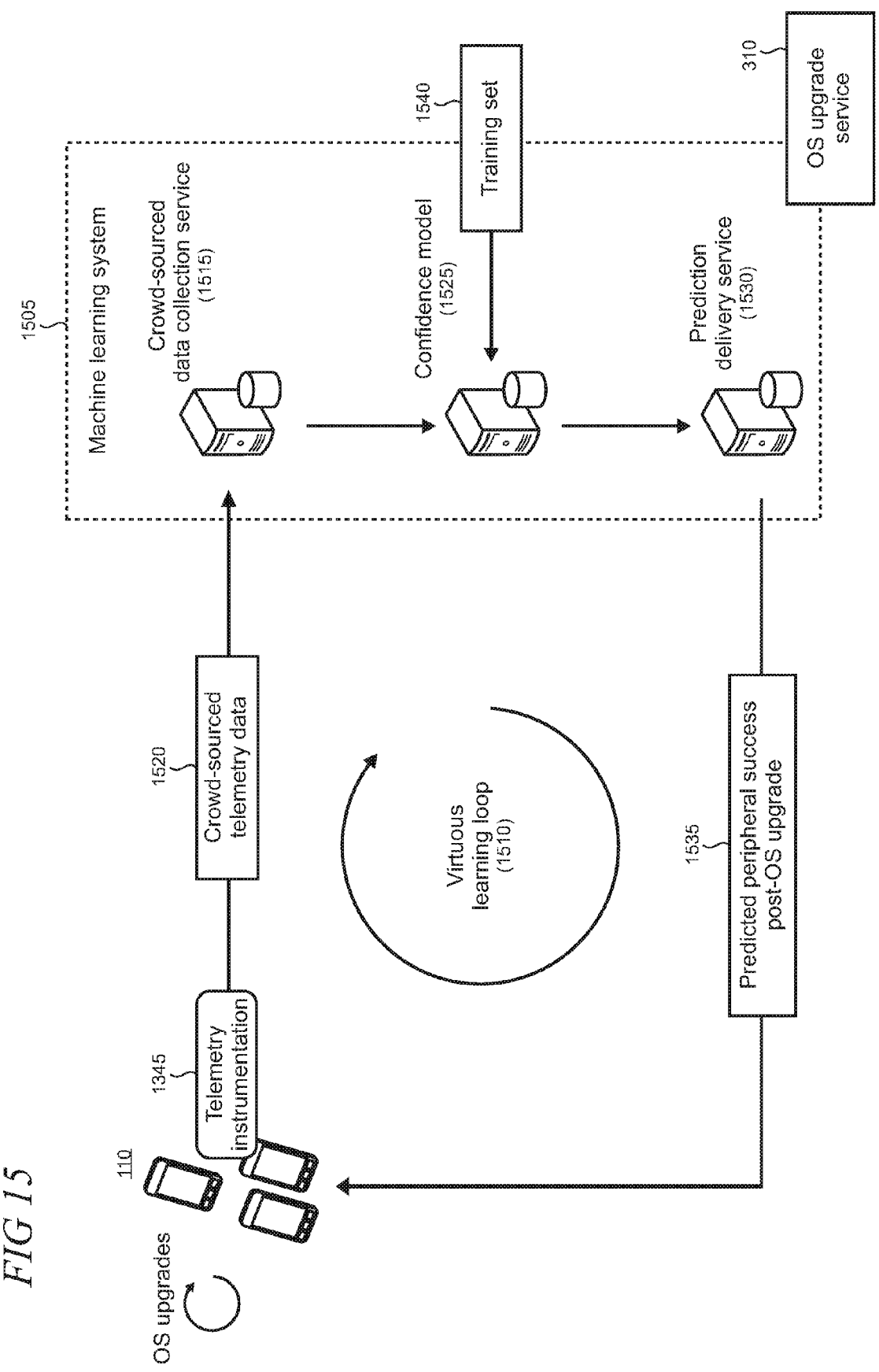
FIG. 15 shows an illustrative machine learning system that operates using a virtuous learning loop.

FIG. 15 shows an illustrative machine learning system 1505 that can be supported by the OS upgrade service 310 and which operates using a virtuous learning loop 1510. The machine learning system 1505 uses a crowd-sourced data collection service 1515 that is configured to receive crowd-sourced telemetry data 1520 from telemetry instrumentation 1345 that is instantiated across a universe of computing devices 110.

With notice to the computing device users and user consent, the telemetry data 1520 is collected by the service 1515 and fed into a confidence model 1525 as OS upgrades are installed on the computing devices. A prediction delivery service 1530 can deliver predictions 1535 of peripheral success after an OS upgrade is completed. The predictions can be expressed using a confidence level, for example, from zero (certain failure) to 100 percent (certain success). The prediction delivery service 1530 can be configured to push the predictions as part of information that is provided to the digital assistant 112, or the service can provide predictions in response to queries from the digital assistant, as described in the illustrative use scenarios in the text accompanying FIGS. 7-12.

A training set 1540 is used to provide initial data to the confidence model 1525. The training set is curated by human analysts to define the correct data variables and data features that drive the confidence model and to separate valuable data from noise. Once the training set is created and input to the confidence model, operations of the model can be largely automated and run as a virtuous loop that typically provides increasingly accurate predictions over time.

Figure 16:
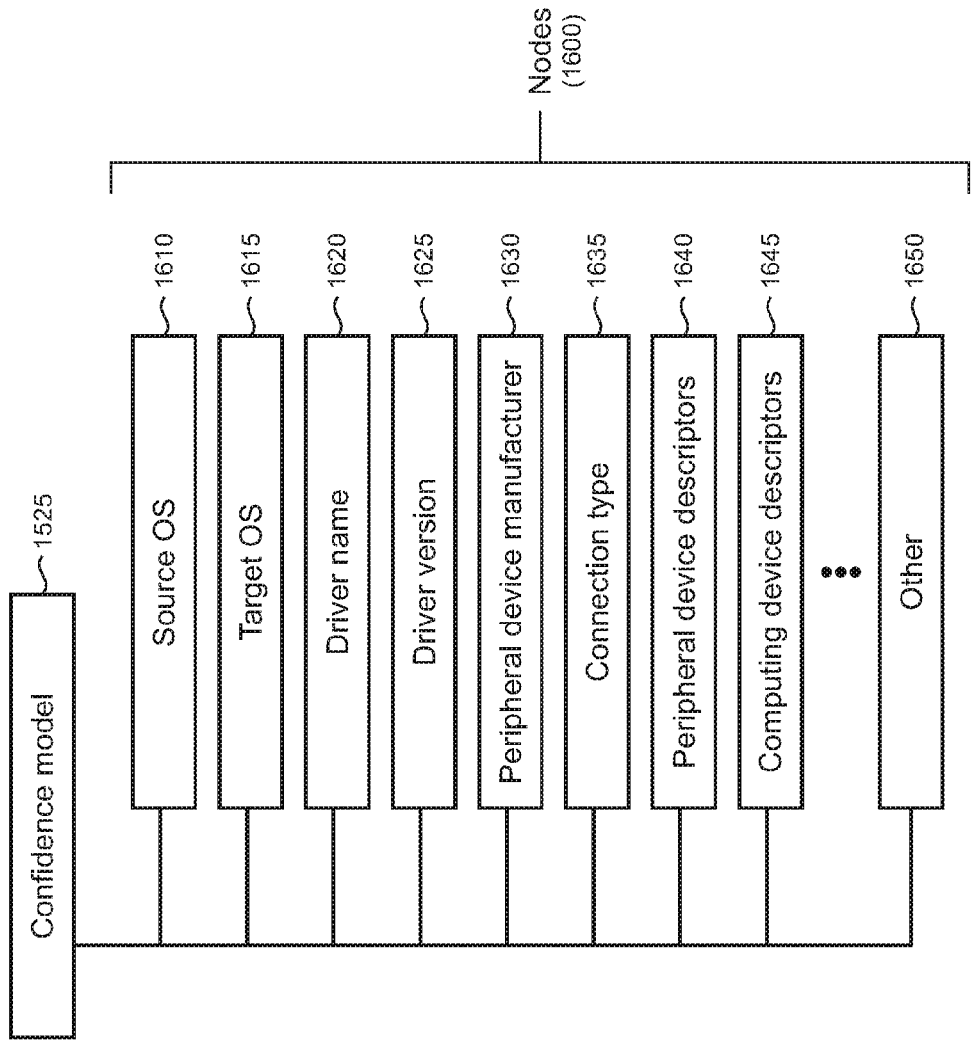
FIG. 16 shows illustrative nodes in a confidence model.

FIG. 16 shows illustrative nodes 1600 that may be utilized in the confidence model 1525. The confidence model is configured as a neural network in this illustrative example. However, other graph types may also be used, including Bayesian networks and decision tree, depending on the requirements of a given implementation of peripheral device support with a digital assistant. The nodes 1600 are exemplary and not every implementation needs to use all the nodes. As shown, the nodes include source OS 1610 (i.e., the current OS that is installed on a computing device 110); target OS 1615 (i.e., the OS to be installed after the upgrade is performed); peripheral driver name 1620; peripheral driver version 1625; peripheral driver manufacturer 1630; peripheral device connection type 1635 (e.g., USB, TCP, etc.); various other descriptors applicable to the peripheral device 1640; various other descriptors applicable to the computing device 1645; and other data or information that may be applicable to a given implementation 1650.

The nodes 1600 in the training set 1540 (FIG. 15) can be given different weights in the confidence model 1525 in some implementations. For example, the source OS 1610 and target OS 1615 can be given relatively more weight and small variations in peripheral driver type can be given relatively less weight. As real world telemetry data 1520 is collected over time, the confidence model 1525 learns which nodes are important in driving the model results and will adjust the weighting. That is, the virtuous loop enables the confidence model to continuously improve to provide peripheral device confidence levels with increasing accuracy.

Figure 17:
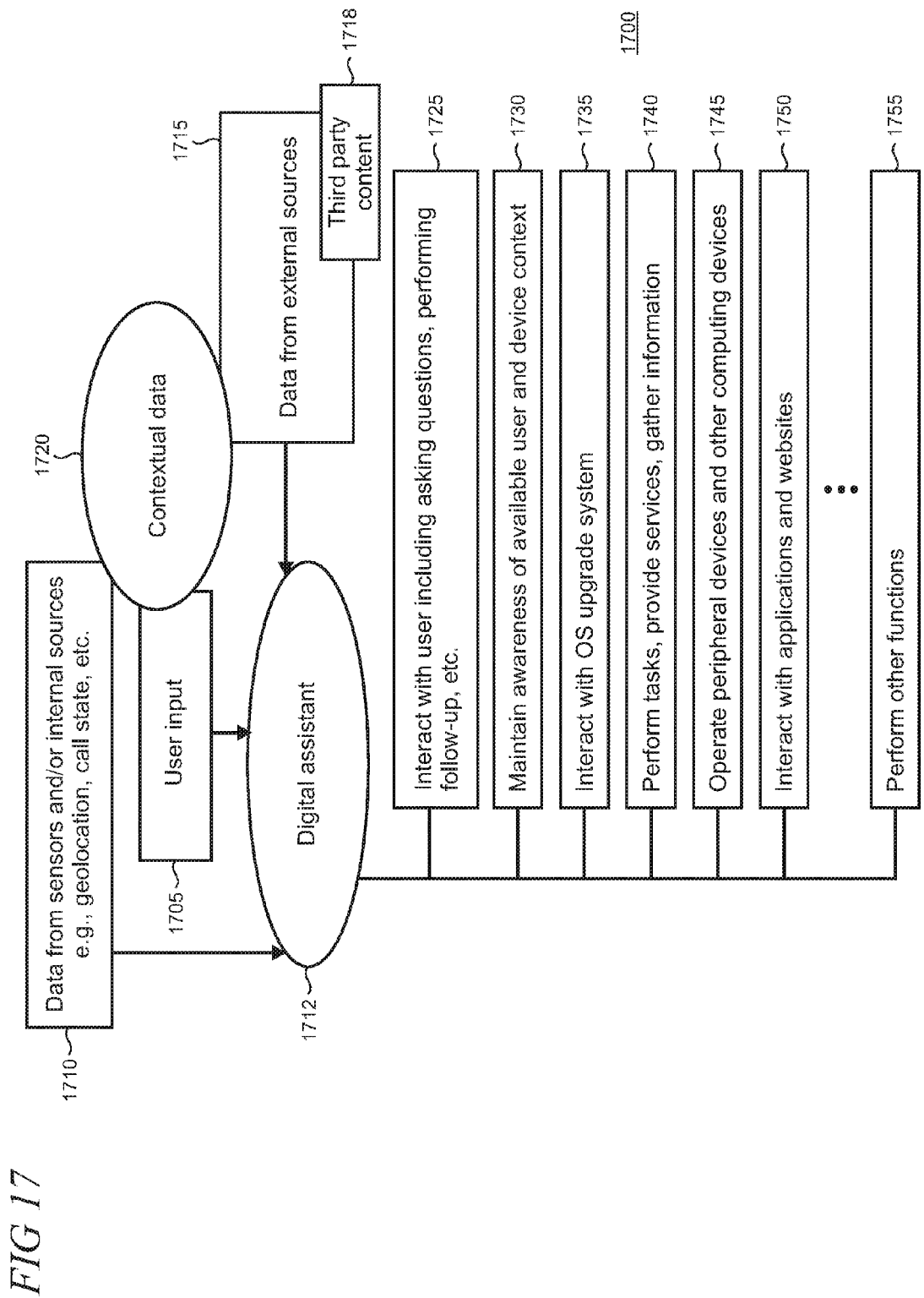
FIG. 17 shows illustrative inputs to a digital assistant and an illustrative taxonomy of general functions that may be performed by a digital assistant.

FIG. 17 shows an illustrative taxonomy of functions 1700 that may typically be supported by the digital assistant 112 either natively or in combination with an application 306, browser 302 (FIG. 3), or the OS upgrade system 1405 (FIG. 14). Inputs to the digital assistant 112 typically can include user input 1705, data from device sensors and/or internal sources 1710, and data from external sources 1715 which can include third-party content 1718. For example, data from internal sources 1710 may include the current location of the device 110 that is reported by a GPS (Global Positioning System) component on the device, or some other location-aware component or sensor. The externally sourced data 1715 may include data provided, for example, by external systems, databases, services, and the like.

The various inputs can be used alone or in various combinations to enable the digital assistant 112 to utilize contextual data 1720 when it operates. Contextual data is data that provides relevant context to a person (e.g., the user), an entity (e.g., one or more devices), or event and can be collected using a sensor package on a device that is configured to sense and analyze data about the user or device environmental surrounding. Sensors in the sensor package may include, for example, camera, accelerometer, location-awareness component, thermometer, altimeter, heart rate sensor, barometer, microphone, or proximity sensor, as described in more detail in the text below accompanying FIG. 27. Contextual data can also be collected from stored data that is associated with a person, entity, or event.

Contextual data can include, for example, time/date, the user's location, speed, acceleration, and/or direction of travel, environmental conditions (e.g., altitude, temperature, barometric pressure), user's physiological state, language, schedule, applications installed on the device, the user's preferences, the user's behaviors (in which such behaviors may be monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like.

As shown, the digital assistant functions 1700 illustratively include interacting with the user 1725 (through a natural language user interface and other graphical interfaces, for example); maintaining awareness of available user and device context 1730; interacting with the OS upgrade system 1735; performing tasks (e.g., making note of appointments in the user's calendar, sending messages and emails, etc.), providing services (e.g., answering questions from the user, mapping directions to a destination, setting alarms, forwarding notifications, reading emails, news, blogs, etc.), and gathering information (e.g., finding information requested by the user about a book or movie, locating the nearest Italian restaurant, etc.) 1740; operating devices 1745 (e.g., setting preferences, adjusting screen brightness, turning wireless connections such as Wi-Fi and Bluetooth® on and off, communicating with other devices, controlling smart appliances, etc.); interacting with applications, websites, and remote services and resources 1750; and performing various other functions 1755. The list of functions 1700 is not intended to be exhaustive and other functions may be provided by the digital assistant 112, applications 304 and 306, and/or services/remote resources as may be needed for a particular implementation of the present peripheral device support with a digital assistant for OS upgrades.

Figure 18:
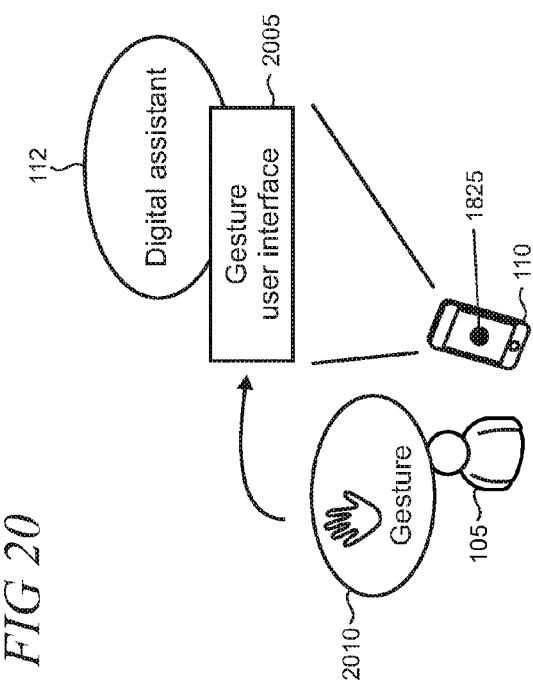
FIGS. 18, 19, and 20 show illustrative interfaces between a user and a digital assistant.

A user can typically interact with the digital assistant 112 in a number of ways depending on the features and functionalities supported by a given device 110. For example, as shown in FIG. 18, the digital assistant 112 may expose a tangible user interface 1805 that enables the user 105 to employ physical interactions 1810 in support of user experiences on the device 110. Such physical interactions can include manipulation of physical and/or virtual controls such as buttons, menus, keyboards, etc., using touch-based inputs like tapping, flicking, dragging, etc. on a touchscreen supporting a graphical user interface 1825, and the like.

Figure 19:
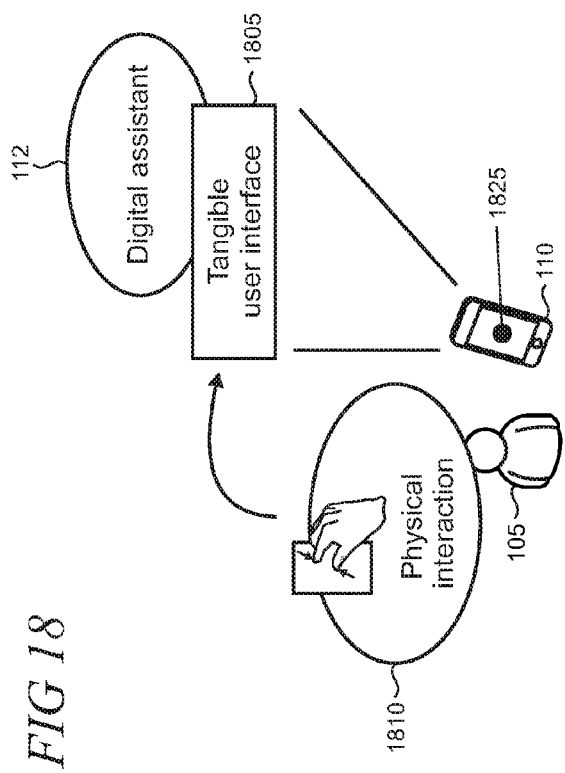

In some implementations, the digital assistant 112 may expose a natural language user interface 1905 shown in FIG. 19, or alternatively a voice command-based user interface (not shown), with which the user employs voice 1910 to provide various inputs to the device 110.

Figure 20:
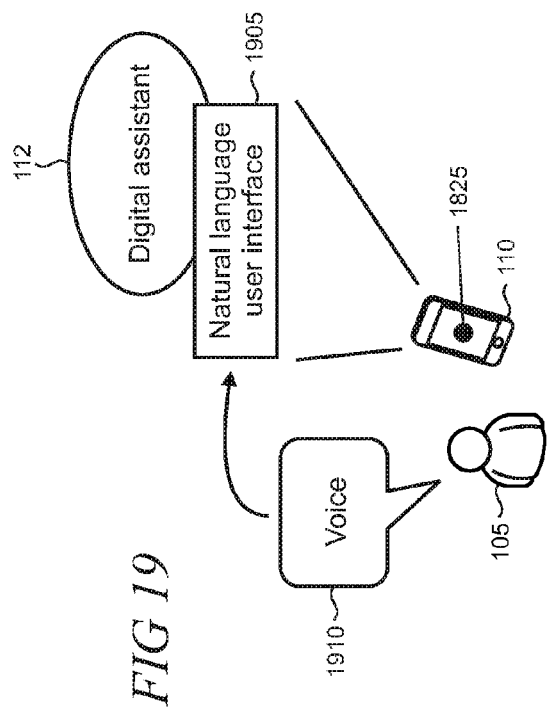

In other implementations, the digital assistant 112 may expose a gesture user interface 2005 shown in FIG. 20 with which the user 105 employs gestures 2010 to provide inputs to the device 110. The gestures 2010 can include touch-based gestures and touchless gestures. It is noted that in some cases, combinations of user interfaces may be utilized where the user may employ, for example, both voice and physical inputs to interact with the digital assistant 112 and the device 110. The user gestures can be sensed using various techniques such as optical sensing, touch sensing, proximity sensing, and the like.

Figure 21:
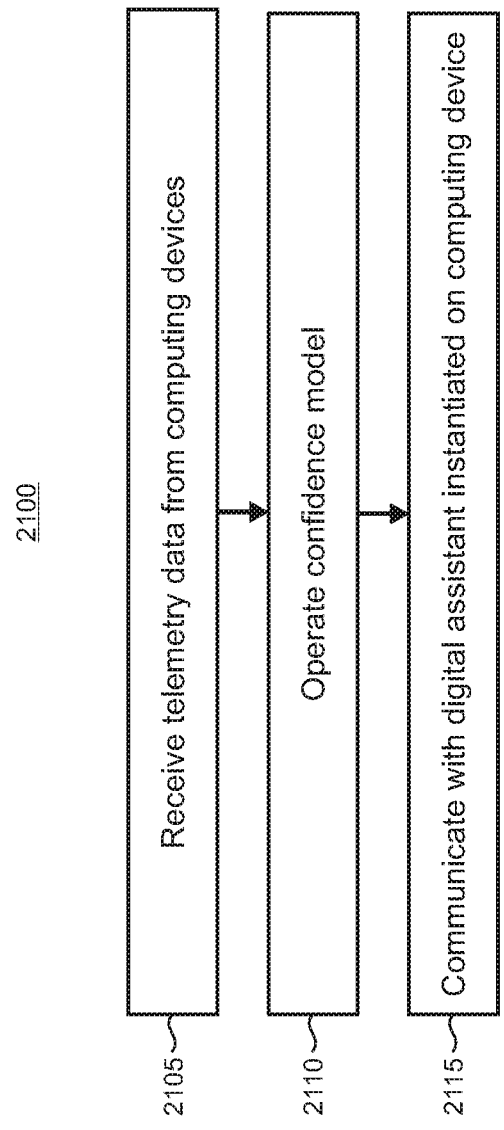
FIGS. 21, 22, and 23 show illustrative methods that may be performed when implementing the present peripheral device support with a digital assistant for OS upgrades.

FIG. 21 shows a flowchart of an illustrative method 2100 that may be performed by a computer server associated with the OS upgrade service 310 (FIG. 3). Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2105, telemetry data is received from one or more computing devices that are associated with respective users. The telemetry data describes successes and failures of peripheral devices in operating after installation of the OS upgrade on the computing devices. For example, the telemetry data can comprise real world data that is crowd sourced across a universe or plurality of computing devices.

In step 2110, a confidence model is operated on the computer server. The confidence model uses the received telemetry to generate a prediction of successful operation for an identified peripheral device after the OS upgrade is completed. For example, the digital assistant instantiated on the computing device can identify a peripheral device in a query to the OS upgrade system, or the system can identify the device. The confidence model can be built using a neural network, a decision tree graph, or a Bayesian network and includes nodes which can be weighted. The nodes can include one or more of source OS, target OS, peripheral device driver name, peripheral device driver version, peripheral device manufacturer, or type of connection between the peripheral device and the computing device.

In step 2115, the server communicates with the digital assistant so that the digital assistant is enabled to provide a notification to the user of the computing device. The notification is based on the prediction generated using the confidence model.

Figure 22:
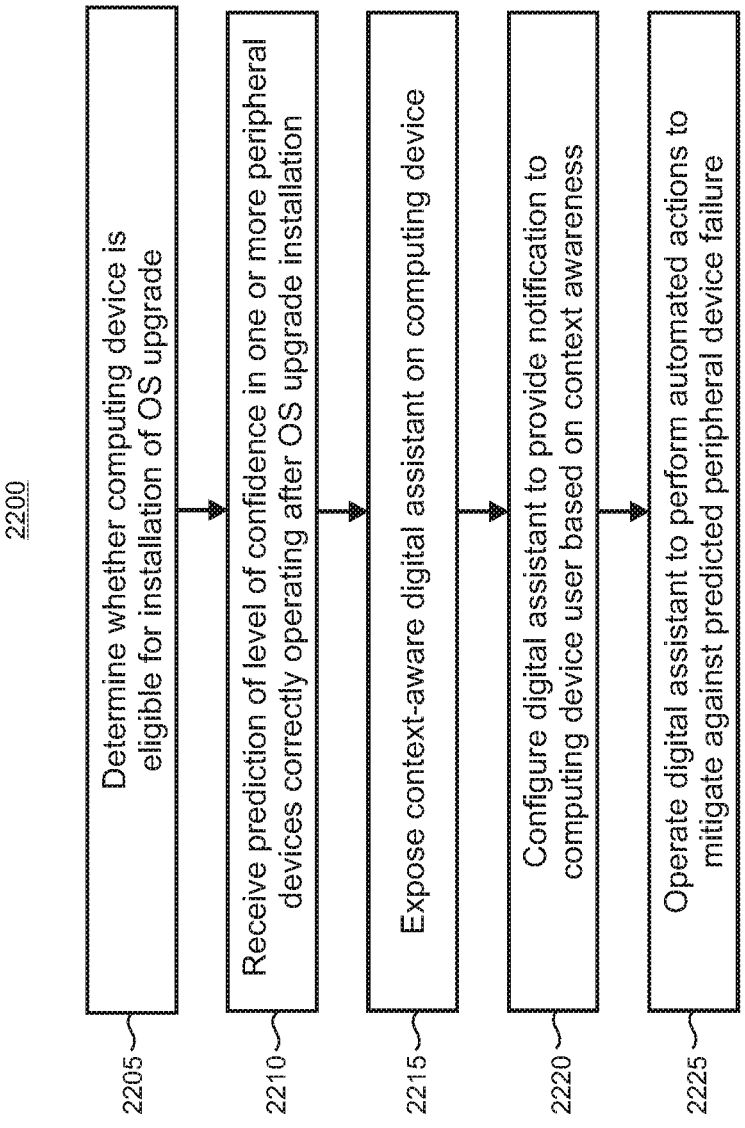

FIG. 22 shows a flowchart of an illustrative method 2200 that may be performed by a computing device. In step 2205, a determination is made as to whether the computing device (or another computing device that is associated with the user) is eligible for an OS upgrade. For example, the user's smartphone can be utilized to determine that the user's laptop computer is OS upgrade-eligible. In step 2210, a level of confidence in one or more peripheral devices correctly operating after the OS upgrade is installed is received. For example, the confidence model utilized by the OS upgrade service can make the prediction which can be pushed to the computing device or received after the digital assistant performs a query to the OS upgrade system.

In step 2215, a context-aware digital assistant is exposed on the computing device. Context awareness may be maintained, for example, by monitoring user behavior or user interactions with the device, or by accessing contextual data associated with the user or device. In step 2220, the digital assistant is configured to provide a notification to the user about the OS upgrade eligibility based on the context awareness. For example, the digital assistant can monitor available context to find an appropriate opportunity to surface the notification to the user when the user is likely to pay attention to the notification. The notification can be made using language, graphics, or text messages, for example.

In step 2225, the digital assistant performs automated actions using its context awareness to provide mitigation to a predicted failure of a peripheral device to correctly operate after the OS upgrade installation. For example, the digital assistant can visit a website or interact with a search service to find information that pertains to the peripheral device having the predicted failure, or collect information from one or more knowledge bases.

Figure 23:
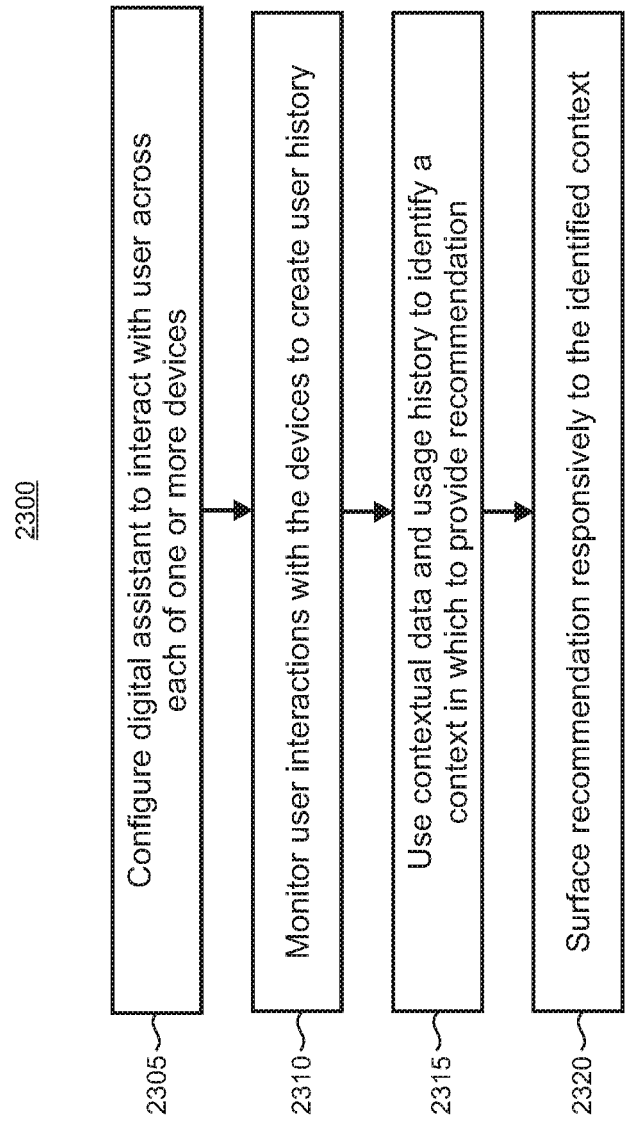

FIG. 23 shows a flowchart of an illustrative method 2300 that may be performed by a computing device. In step 2305, a digital assistant is configured to interact with a user across each of one or more devices using at least one of voice, physical interaction, or sensed gesture, and collect contextual data associated with the user. In step 2310, user interactions with the devices are monitored (typically with notice to the user and consent from the user) to create a user history. In step 2315, contextual data and user history is utilized to identify a context with which to provide an OS upgrade recommendation to the user. The recommendation is based on a predicted confidence that one or more peripheral devices associated with a computing device successfully operate after the OS on the computing device is upgraded. The confidence may be predicted using a machine learning system that is operated as a virtuous loop. The recommendation may also be based on a categorization of the peripheral devices as critical or non-critical. In step 2320, the recommendation is surfaced to the user through the digital assistant responsively to the identified context.

Figure 24:
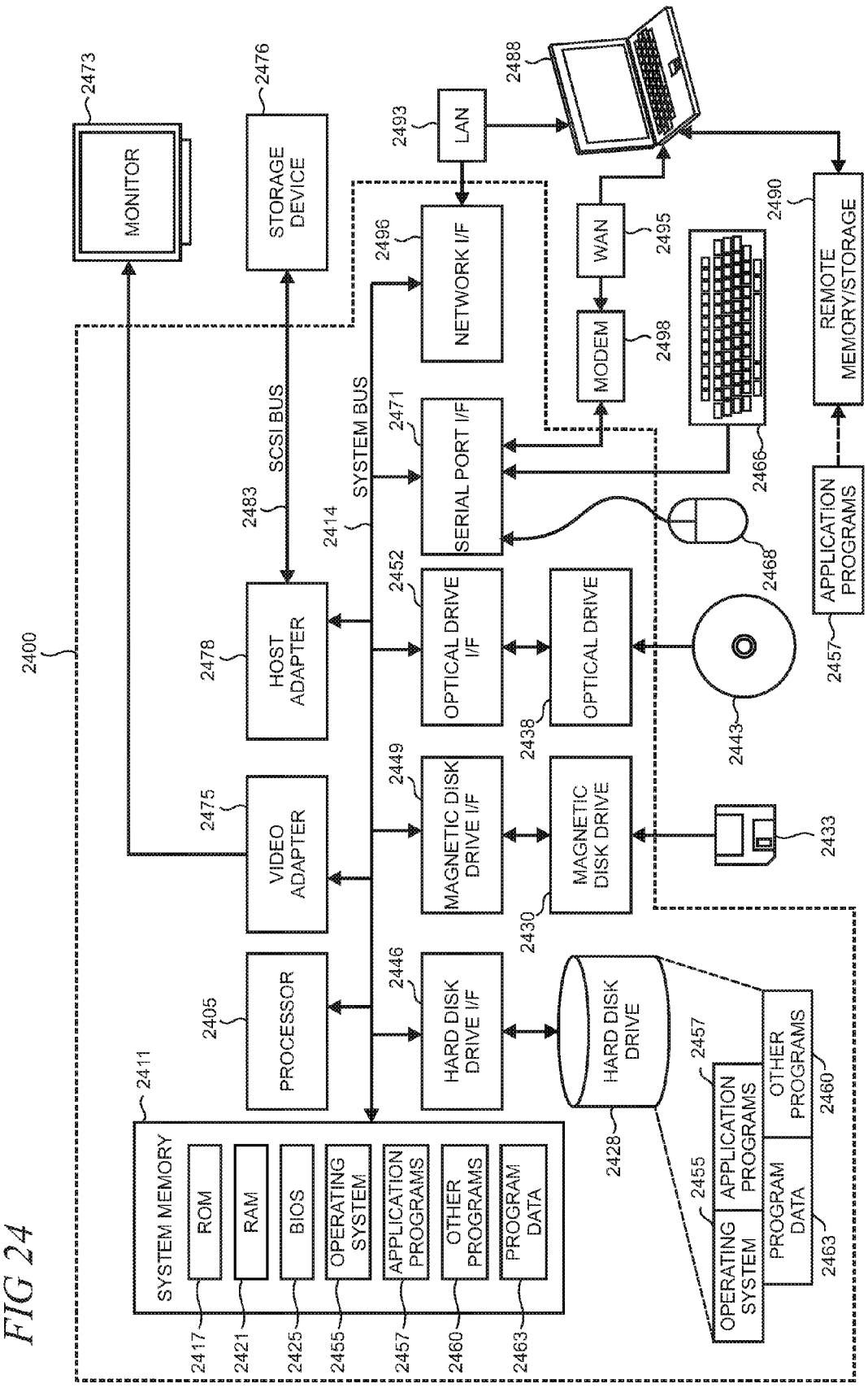
FIG. 24 is a simplified block diagram of an illustrative computer system such as a personal computer (PC) that may be used in part to implement the present peripheral device support with a digital assistant for OS upgrades.

FIG. 24 is a simplified block diagram of an illustrative computer system 2400 such as a PC, client machine, or server with which the present peripheral device support with a digital assistant for OS upgrades may be implemented. Computer system 2400 includes a processor 2405, a system memory 2411, and a system bus 2414 that couples various system components including the system memory 2411 to the processor 2405. The system bus 2414 may be any of several types of bus structures including a memory bus or memory controller, a peripheral bus, or a local bus using any of a variety of bus architectures. The system memory 2411 includes read only memory (ROM) 2417 and random access memory (RAM) 2421. A basic input/output system (BIOS) 2425, containing the basic routines that help to transfer information between elements within the computer system 2400, such as during startup, is stored in ROM 2417. The computer system 2400 may further include a hard disk drive 2428 for reading from and writing to an internally disposed hard disk (not shown), a magnetic disk drive 2430 for reading from or writing to a removable magnetic disk 2433 (e.g., a floppy disk), and an optical disk drive 2438 for reading from or writing to a removable optical disk 2443 such as a CD (compact disc), DVD (digital versatile disc), or other optical media. The hard disk drive 2428, magnetic disk drive 2430, and optical disk drive 2438 are connected to the system bus 2414 by a hard disk drive interface 2446, a magnetic disk drive interface 2449, and an optical drive interface 2452, respectively. The drives and their associated computer-readable storage media provide non-volatile storage of computer-readable instructions, data structures, program modules, and other data for the computer system 2400. Although this illustrative example includes a hard disk, a removable magnetic disk 2433, and a removable optical disk 2443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present peripheral device support with a digital assistant for OS upgrades. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2433, optical disk 2443, ROM 2417, or RAM 2421, including an operating system 2455, one or more application programs 2457, other program modules 2460, and program data 2463. A user may enter commands and information into the computer system 2400 through input devices such as a keyboard 2466 and pointing device 2468 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2405 through a serial port interface 2471 that is coupled to the system bus 2414, but may be connected by other interfaces, such as a parallel port, game port, or universal serial bus (USB). A monitor 2473 or other type of display device is also connected to the system bus 2414 via an interface, such as a video adapter 2475. In addition to the monitor 2473, personal computers typically include other peripheral output devices (not shown), such as speakers and printers. The illustrative example shown in FIG. 24 also includes a host adapter 2478, a Small Computer System Interface (SCSI) bus 2483, and an external storage device 2476 connected to the SCSI bus 2483.

The computer system 2400 is operable in a networked environment using logical connections to one or more remote computers, such as a remote computer 2488. The remote computer 2488 may be selected as another personal computer, a server, a router, a network PC, a peer device, or other common network node, and typically includes many or all of the elements described above relative to the computer system 2400, although only a single representative remote memory/storage device 2490 is shown in FIG. 24. The logical connections depicted in FIG. 24 include a local area network (LAN) 2493 and a wide area network (WAN) 2495. Such networking environments are often deployed, for example, in offices, enterprise-wide computer networks, intranets, and the Internet.

When used in a LAN networking environment, the computer system 2400 is connected to the local area network 2493 through a network interface or adapter 2496. When used in a WAN networking environment, the computer system 2400 typically includes a broadband modem 2498, network gateway, or other means for establishing communications over the wide area network 2495, such as the Internet. The broadband modem 2498, which may be internal or external, is connected to the system bus 2414 via a serial port interface 2471. In a networked environment, program modules related to the computer system 2400, or portions thereof, may be stored in the remote memory storage device 2490. It is noted that the network connections shown in FIG. 24 are illustrative and other means of establishing a communications link between the computers may be used depending on the specific requirements of an application of the present peripheral device support with a digital assistant for OS upgrades.

Figure 25:
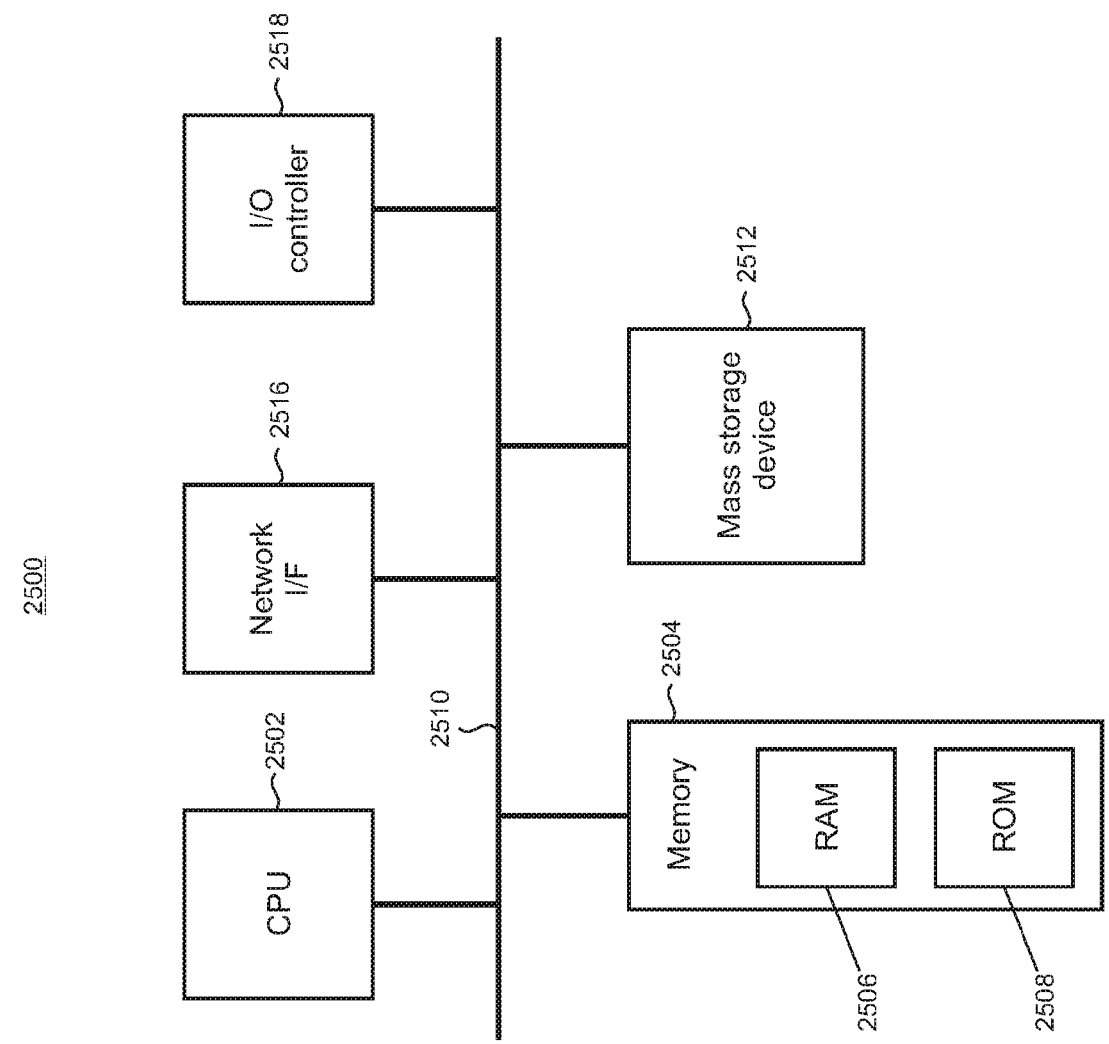
FIG. 25 shows a block diagram of an illustrative device that may be used in part to implement the present peripheral device support with a digital assistant for OS upgrades.

FIG. 25 shows an illustrative architecture 2500 for a device capable of executing the various components described herein for providing the present peripheral device support with a digital assistant for OS upgrades. Thus, the architecture 2500 illustrated in FIG. 25 shows an architecture that may be adapted for a server computer, mobile phone, a PDA, a smartphone, a desktop computer, a netbook computer, a tablet computer, GPS device, gaming console, and/or a laptop computer. The architecture 2500 may be utilized to execute any aspect of the components presented herein.

The architecture 2500 illustrated in FIG. 25 includes a CPU (Central Processing Unit) 2502, a system memory 2504, including a RAM 2506 and a ROM 2508, and a system bus 2510 that couples the memory 2504 to the CPU 2502. A basic input/output system containing the basic routines that help to transfer information between elements within the architecture 2500, such as during startup, is stored in the ROM 2508. The architecture 2500 further includes a mass storage device 2512 for storing software code or other computer-executed code that is utilized to implement applications, the file system, and the operating system.

The mass storage device 2512 is connected to the CPU 2502 through a mass storage controller (not shown) connected to the bus 2510. The mass storage device 2512 and its associated computer-readable storage media provide non-volatile storage for the architecture 2500.

Although the description of computer-readable storage media contained herein refers to a mass storage device, such as a hard disk or CD-ROM drive, it may be appreciated by those skilled in the art that computer-readable storage media can be any available storage media that can be accessed by the architecture 2500.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2500.

According to various embodiments, the architecture 2500 may operate in a networked environment using logical connections to remote computers through a network. The architecture 2500 may connect to the network through a network interface unit 2516 connected to the bus 2510. It may be appreciated that the network interface unit 2516 also may be utilized to connect to other types of networks and remote computer systems. The architecture 2500 also may include an input/output controller 2518 for receiving and processing input from a number of other devices, including a keyboard, mouse, or electronic stylus (not shown in FIG. 25). Similarly, the input/output controller 2518 may provide output to a display screen, a printer, or other type of output device (also not shown in FIG. 25).

It may be appreciated that the software components described herein may, when loaded into the CPU 2502 and executed, transform the CPU 2502 and the overall architecture 2500 from a general-purpose computing system into a special-purpose computing system customized to facilitate the functionality presented herein. The CPU 2502 may be constructed from any number of transistors or other discrete circuit elements, which may individually or collectively assume any number of states. More specifically, the CPU 2502 may operate as a finite-state machine, in response to executable instructions contained within the software modules disclosed herein. These computer-executable instructions may transform the CPU 2502 by specifying how the CPU 2502 transitions between states, thereby transforming the transistors or other discrete hardware elements constituting the CPU 2502.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2500 in order to store and execute the software components presented herein. It also may be appreciated that the architecture 2500 may include other types of computing devices, including handheld computers, embedded computer systems, smartphones, PDAs, and other types of computing devices known to those skilled in the art. It is also contemplated that the architecture 2500 may not include all of the components shown in FIG. 25, may include other components that are not explicitly shown in FIG. 25, or may utilize an architecture completely different from that shown in FIG. 25.

Figure 26:
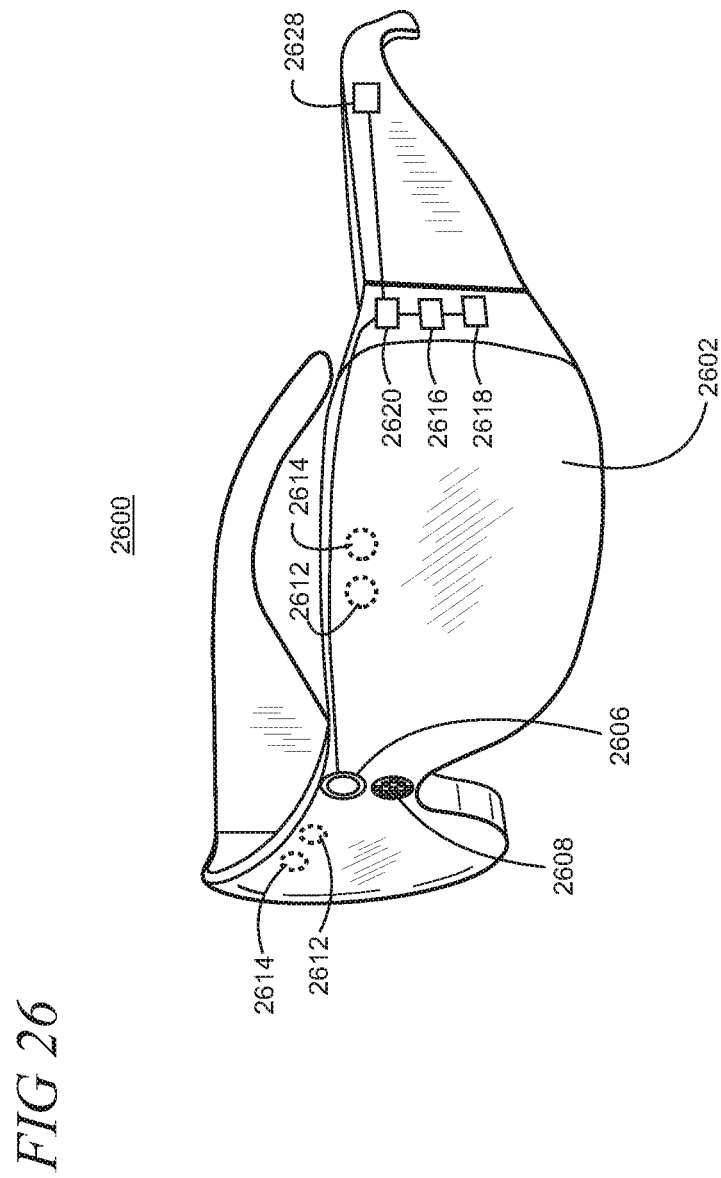
FIG. 26 is a pictorial view of an illustrative example of a virtual reality or mixed reality HMD device.
Figure 27:
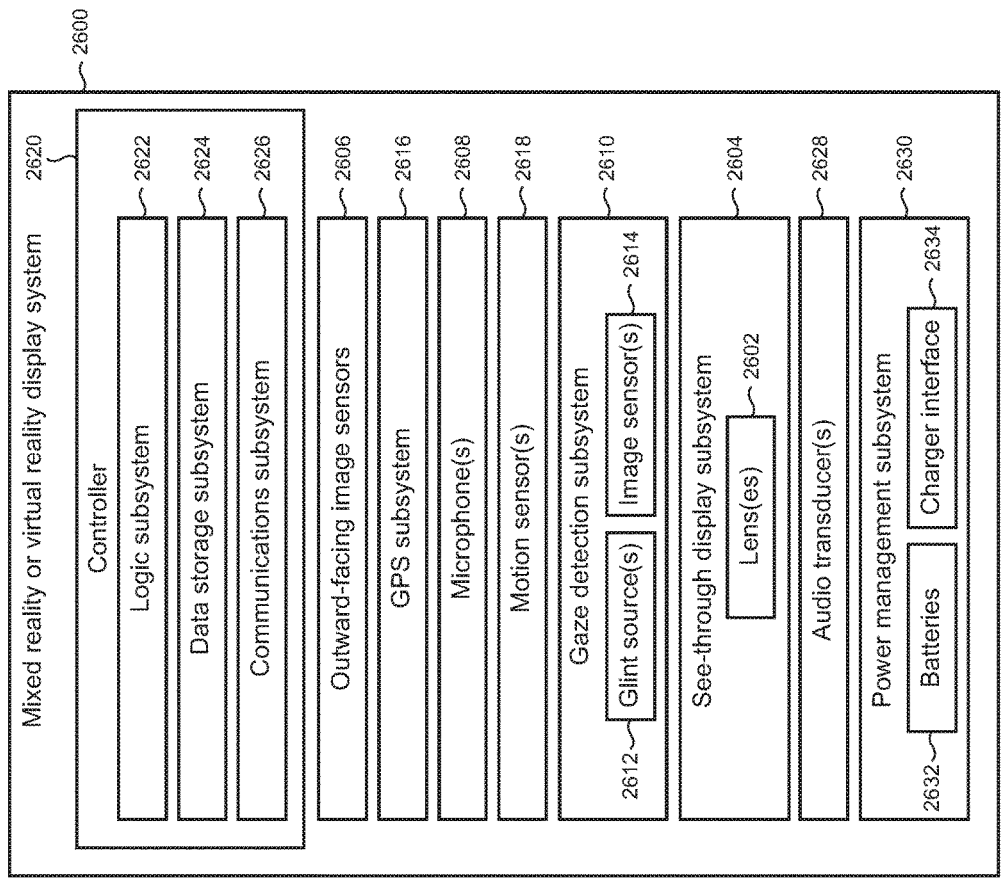
FIG. 27 shows a block diagram of an illustrative example of a virtual reality or mixed reality HMD device.

FIG. 26 shows one particular illustrative example of a see-through, augmented reality or virtual reality display system 2600, and FIG. 27 shows a functional block diagram of the system 2600. Display system 2600 comprises one or more lenses 2602 that form a part of a see-through display subsystem 2604, such that images may be displayed using lenses 2602 (e.g. using projection onto lenses 2602, one or more waveguide systems incorporated into the lenses 2602, and/or in any other suitable manner). Display system 2600 further comprises one or more outward-facing image sensors 2606 configured to acquire images of a background scene and/or physical environment being viewed by a user, and may include one or more microphones 2608 configured to detect sounds, such as voice commands from a user. Outward-facing image sensors 2606 may include one or more depth sensors and/or one or more two-dimensional image sensors. In alternative arrangements, as noted above, an augmented reality or virtual reality display system, instead of incorporating a see-through display subsystem, may display augmented reality or virtual reality images through a viewfinder mode for an outward-facing image sensor.

The display system 2600 may further include a gaze detection subsystem 2610 configured for detecting a direction of gaze of each eye of a user or a direction or location of focus, as described above. Gaze detection subsystem 2610 may be configured to determine gaze directions of each of a user's eyes in any suitable manner. For example, in the illustrative example shown, a gaze detection subsystem 2610 includes one or more glint sources 2612, such as infrared light sources, that are configured to cause a glint of light to reflect from each eyeball of a user, and one or more image sensors 2614, such as inward-facing sensors, that are configured to capture an image of each eyeball of the user. Changes in the glints from the user's eyeballs and/or a location of a user's pupil, as determined from image data gathered using the image sensor(s) 2614, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2610 may have any suitable number and arrangement of light sources and image sensors. In some implementations, the gaze detection subsystem 2610 may be omitted.

The display system 2600 may also include additional sensors. For example, display system 2600 may comprise a global positioning system (GPS) subsystem 2616 to allow a location of the display system 2600 to be determined. This may help to identify real-world objects, such as buildings, etc. that may be located in the user's adjoining physical environment.

The display system 2600 may further include one or more motion sensors 2618 (e.g., inertial, multi-axis gyroscopic, or acceleration sensors) to detect movement and position/orientation/pose of a user's head when the user is wearing the system as part of an augmented reality or virtual reality HMD device. Motion data may be used, potentially along with eye-tracking glint data and outward-facing image data, for gaze detection, as well as for image stabilization to help correct for blur in images from the outward-facing image sensor(s) 2606. The use of motion data may allow changes in gaze location to be tracked even if image data from outward-facing image sensor(s) 2606 cannot be resolved.

In addition, motion sensors 2618, as well as microphone(s) 2608 and gaze detection subsystem 2610, also may be employed as user input devices, such that a user may interact with the display system 2600 via gestures of the eye, neck and/or head, as well as via verbal commands in some cases. It may be understood that sensors illustrated in FIGS. 26 and 27 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 2600 can further include a controller 2620 having a logic subsystem 2622 and a data storage subsystem 2624 in communication with the sensors, gaze detection subsystem 2610, display subsystem 2604, and/or other components through a communications subsystem 2626. The communications subsystem 2626 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2624 may include instructions stored thereon that are executable by logic subsystem 2622, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 2600 is configured with one or more audio transducers 2628 (e.g., speakers, earphones, etc.) so that audio can be utilized as part of an augmented reality or virtual reality experience. A power management subsystem 2630 may include one or more batteries 2632 and/or protection circuit modules (PCMs) and an associated charger interface 2634 and/or remote power interface for supplying power to components in the display system 2600.

It may be appreciated that the display system 2600 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 28:
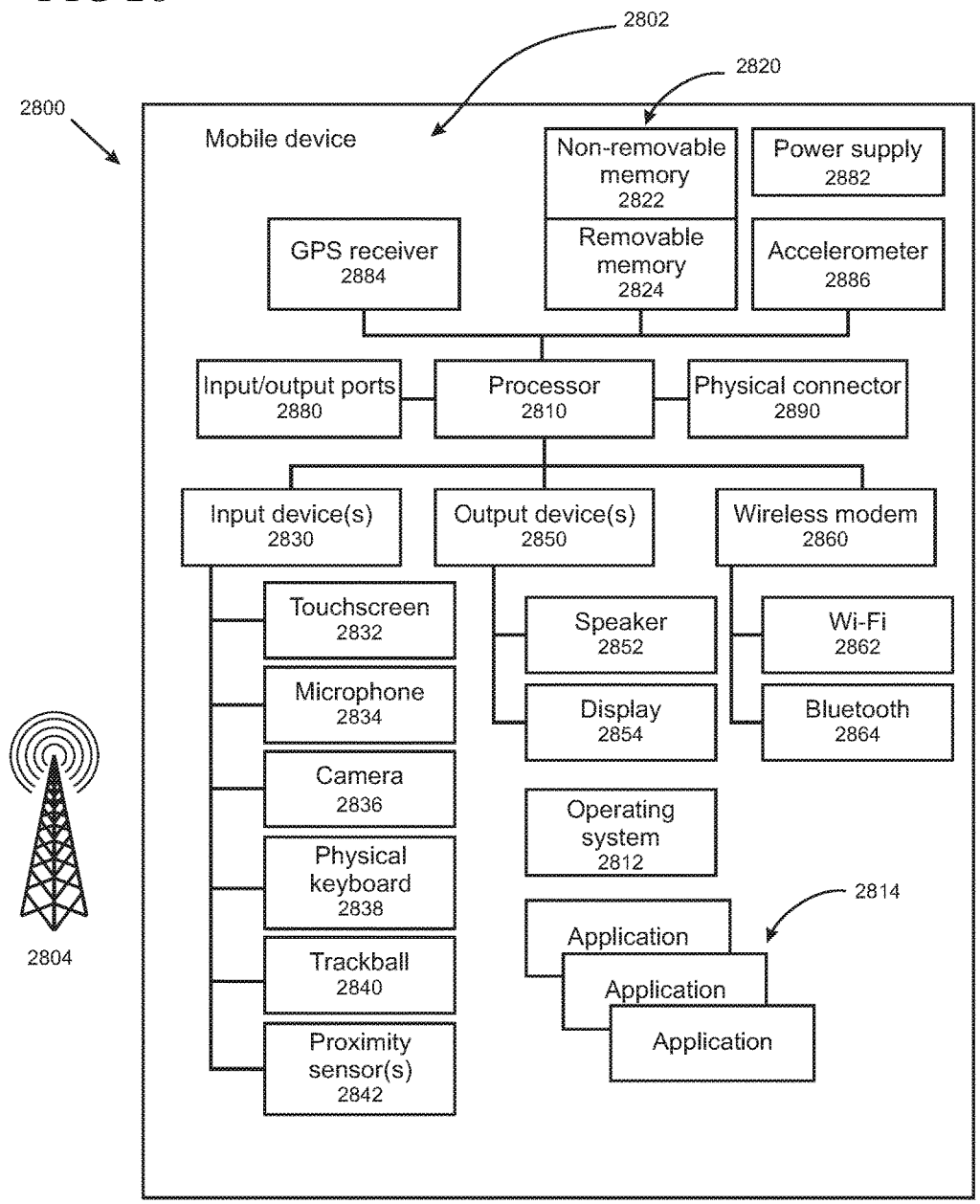
FIG. 28 is a block diagram of an illustrative device such as a mobile phone or smartphone.

FIG. 28 is a functional block diagram of an illustrative device 2800 such as a mobile phone or smartphone including a variety of optional hardware and software components, shown generally at 2802. Any component 2802 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2804, such as a cellular or satellite network.

The illustrated device 2800 can include a controller or processor 2810 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2812 can control the allocation and usage of the components 2802, including power states, above-lock states, and below-lock states, and provides support for one or more application programs 2814. The application programs can include common mobile computing applications (e.g., image-capture applications, email applications, calendars, contact managers, web browsers, messaging applications), or any other computing application.

The illustrated device 2800 can include memory 2820. Memory 2820 can include non-removable memory 2822 and/or removable memory 2824. The non-removable memory 2822 can include RAM, ROM, Flash memory, a hard disk, or other well-known memory storage technologies. The removable memory 2824 can include Flash memory or a Subscriber Identity Module (SIM) card, which is well known in GSM (Global System for Mobile communications) systems, or other well-known memory storage technologies, such as "smart cards." The memory 2820 can be used for storing data and/or code for running the operating system 2812 and the application programs 2814. Example data can include web pages, text, images, sound files, video data, or other data sets to be sent to and/or received from one or more network servers or other devices via one or more wired or wireless networks.

The memory 2820 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 2800.

The memory 2820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 2800 can support one or more input devices 2830; such as a touchscreen 2832; microphone 2834 for implementation of voice input for voice recognition, voice commands and the like; camera 2836; physical keyboard 2838; trackball 2840; and/or proximity sensor 2842; and one or more output devices 2850, such as a speaker 2852 and one or more displays 2854. Other input devices (not shown) using gesture recognition may also be utilized in some cases. Other possible output devices (not shown) can include piezoelectric or haptic output devices. Some devices can serve more than one input/output function. For example, touchscreen 2832 and display 2854 can be combined into a single input/output device.

A wireless modem 2860 can be coupled to an antenna (not shown) and can support two-way communications between the processor 2810 and external devices, as is well understood in the art. The modem 2860 is shown generically and can include a cellular modem for communicating with the mobile communication network 2804 and/or other radio-based modems (e.g., Bluetooth® 2864 or Wi-Fi 2862). The wireless modem 2860 is typically configured for communication with one or more cellular networks, such as a GSM network for data and voice communications within a single cellular network, between cellular networks, or between the device and a public switched telephone network (PSTN).

The device can further include at least one input/output port 2880, a power supply 2882, a satellite navigation system receiver 2884, such as a GPS receiver, an accelerometer 2886, a gyroscope (not shown), and/or a physical connector 2890, which can be a USB port, IEEE 1394 (FireWire) port, and/or an RS-232 port. The illustrated components 2802 are not required or all-inclusive, as any components can be deleted and other components can be added.

Figure 29:
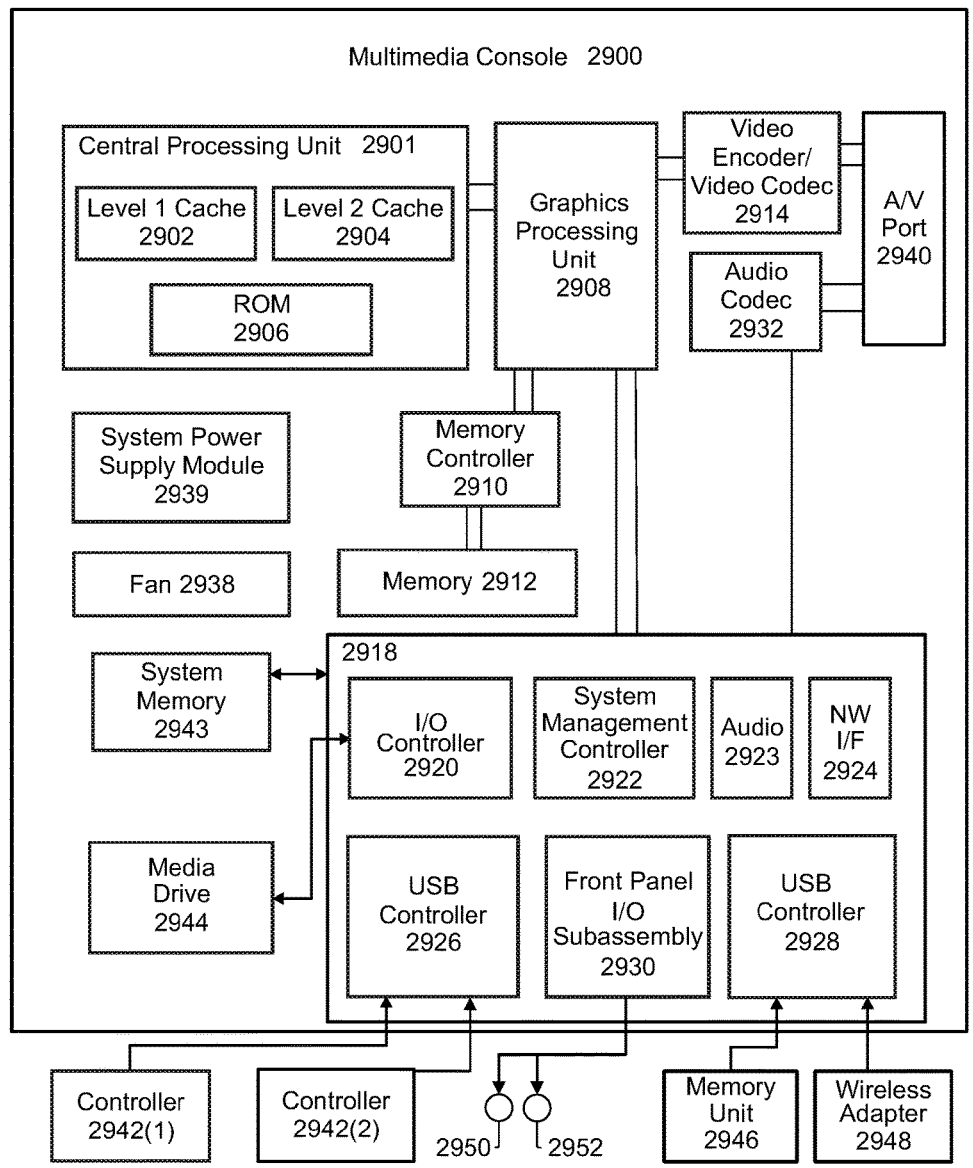
FIG. 29 is a block diagram of an illustrative multimedia console.

FIG. 29 is an illustrative functional block diagram of a multimedia console 2900. The multimedia console 2900 has a central processing unit (CPU) 2901 having a level 1 cache 2902, a level 2 cache 2904, and a Flash ROM (Read Only Memory) 2906. The level 1 cache 2902 and the level 2 cache 2904 temporarily store data and hence reduce the number of memory access cycles, thereby improving processing speed and throughput. The CPU 2901 may be configured with more than one core, and thus, additional level 1 and level 2 caches 2902 and 2904. The Flash ROM 2906 may store executable code that is loaded during an initial phase of a boot process when the multimedia console 2900 is powered ON.

A graphics processing unit (GPU) 2908 and a video encoder/video codec (coder/decoder) 2914 form a video processing pipeline for high speed and high resolution graphics processing. Data is carried from the GPU 2908 to the video encoder/video codec 2914 via a bus. The video processing pipeline outputs data to an A/V (audio/video) port 2940 for transmission to a television or other display. A memory controller 2910 is connected to the GPU 2908 to facilitate processor access to various types of memory 2912, such as, but not limited to, a RAM.

The multimedia console 2900 includes an I/O controller 2920, a system management controller 2922, an audio processing unit 2923, a network interface controller 2924, a first USB (Universal Serial Bus) host controller 2926, a second USB controller 2928, and a front panel I/O subassembly 2930 that are preferably implemented on a module 2918. The USB controllers 2926 and 2928 serve as hosts for peripheral controllers 2942(1) and 2942(2), a wireless adapter 2948, and an external memory device 2946 (e.g., Flash memory, external CD/DVD ROM drive, removable media, etc.). The network interface controller 2924 and/or wireless adapter 2948 provide access to a network (e.g., the Internet, home network, etc.) and may be any of a wide variety of various wired or wireless adapter components including an Ethernet card, a modem, a Bluetooth® module, a cable modem, or the like.

System memory 2943 is provided to store application data that is loaded during the boot process. A media drive 2944 is provided and may comprise a DVD/CD drive, hard drive, or other removable media drive, etc. The media drive 2944 may be internal or external to the multimedia console 2900. Application data may be accessed via the media drive 2944 for execution, playback, etc. by the multimedia console 2900. The media drive 2944 is connected to the I/O controller 2920 via a bus, such as a Serial ATA bus or other high speed connection (e.g., IEEE 1394).

The system management controller 2922 provides a variety of service functions related to assuring availability of the multimedia console 2900. The audio processing unit 2923 and an audio codec 2932 form a corresponding audio processing pipeline with high fidelity and stereo processing. Audio data is carried between the audio processing unit 2923 and the audio codec 2932 via a communication link. The audio processing pipeline outputs data to the A/V port 2940 for reproduction by an external audio player or device having audio capabilities.

The front panel I/O subassembly 2930 supports the functionality of the power button 2950 and the eject button 2952, as well as any LEDs (light emitting diodes) or other indicators exposed on the outer surface of the multimedia console 2900. A system power supply module 2939 provides power to the components of the multimedia console 2900. A fan 2938 cools the circuitry within the multimedia console 2900.

The CPU 2901, GPU 2908, memory controller 2910, and various other components within the multimedia console 2900 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 2900 is powered ON, application data may be loaded from the system memory 2943 into memory 2912 and/or caches 2902 and 2904 and executed on the CPU 2901. The application may present a graphical user interface that provides a consistent user experience when navigating to different media types available on the multimedia console 2900. In operation, applications and/or other media contained within the media drive 2944 may be launched or played from the media drive 2944 to provide additional functionalities to the multimedia console 2900.

The multimedia console 2900 may be operated as a standalone system by simply connecting the system to a television or other display. In this standalone mode, the multimedia console 2900 allows one or more users to interact with the system, watch movies, or listen to music. However, with the integration of broadband connectivity made available through the network interface controller 2924 or the wireless adapter 2948, the multimedia console 2900 may further be operated as a participant in a larger network community.

When the multimedia console 2900 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 2900 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2901 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2942(1) and 2942(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present peripheral device support with a digital assistant for operating system upgrades are now presented by way of illustration and not as an exhaustive list of all embodiments. An example includes one or more computer-readable memory devices storing instructions which, when executed by one or more processors disposed in a computer server, cause the computer server to: receive telemetry data from one or more computing devices associated with respective users, in which the telemetry data describes successes and failures of a plurality of peripheral devices to operate after installation of an operating system (OS) upgrade on the one or more computing devices; operate a confidence model that uses the received telemetry data to generate a prediction for successful post-OS upgrade operation of an identified peripheral device; and communicate with a digital assistant instantiated on the one or more computing devices so that the digital assistant is enabled to provide a notification of an OS upgrade to a user based on the prediction for successful post-OS upgrade operation.

In another example, the executed instructions cause the computer server to crowd-source telemetry data across a plurality of computing devices. In another example, the prediction is expressed with a level of confidence. In another example, the confidence model comprises at least one of neural network, decision tree graph, or Bayesian network. In another example, the confidence model includes a plurality of nodes, the nodes including one or more of source OS, target OS, peripheral device driver name, peripheral device driver version, peripheral device manufacturer, or type of connection between the peripheral device and the computing device. In another example, the nodes are weighted.

A further example includes a computing device operable by a user, comprising: one or more processors; a user interface (UI) configured to interact with a user of the computing device; and a hardware-based memory device storing computer-readable instructions which, when executed by the one or more processors, cause the computing device to determine whether the computing device, or another computing device associated with the user, is eligible for installation of an operating system (OS) upgrade, predict a level of confidence in one or more peripheral devices correctly operating after the OS upgrade installation, expose a digital assistant on the device, the digital assistant configured to maintain context awareness by monitoring user behavior or user interactions with the device, or by accessing contextual data associated with the user or device, configure the digital assistant to provide a notification to the user about the OS upgrade eligibility based on the context awareness, operate the digital assistant to perform automated actions using the context awareness, wherein the automated actions are configured to provide a mitigation to a predicted failure of a peripheral device to correctly operate after OS upgrade installation.

In another example, the executed instructions further cause the computing device to identify the peripheral device when a predicted confidence of successful operation after the OS upgrade installation is below a predetermined level. In another example, the executed instructions further cause the computing device to operate the digital assistant to provide a confidence level for successful operation after the OS upgrade installation for each of the one or more peripheral devices. In another example, the executed instructions further cause the computing device to operate the digital assistant to provide an aggregated confidence level for successful operation after the OS upgrade installation across a plurality of peripheral devices. In another example, the executed instructions further cause the computing device to maintain context awareness using data comprising one or more of time/date, location of the user or device, language, schedule, applications installed on the device, user preferences, user behaviors, user activities, stored contacts, call history, messaging history, browsing history, application usage history, device type, device capabilities, or communication network type. In another example, the executed instructions further cause the computing device to receive an input from the user that expresses a minimum level of confidence for one or more peripheral devices as a condition to be met before the OS upgrade installation is performed. In another example, the context awareness is further maintained by using sensor data collected by sensors on the computing device, the sensors including one or more of camera, accelerometer, location-awareness component, thermometer, altimeter, heart rate sensor, barometer, microphone, or proximity sensor. In another example, the automated actions comprise one or more of visiting a website or interacting with a search service to find information that pertains to the peripheral device having the predicted failure. In another example, the automated actions comprise collecting information from one or more knowledge base articles pertaining to the peripheral device having the predicted failure. In another example, the digital assistant is further configured to interact with the user using language, graphics, or text messages to exchange information pertaining to the OS upgrade installation.

A further example includes a method for providing a recommendation to install an operating system (OS) upgrade to a user of one or more computing devices, comprising: configuring a digital assistant to i) interact with the user across each of the one or more computing devices using at least one of voice, physical interaction, or sensed gesture, and ii) collect contextual data associated with the user; monitoring the user's interactions with the one or more computing devices to create a user history; using the contextual data and user history to identify a context in which to provide the recommendation; and surfacing the recommendation to the user through the digital assistant responsively to the identified context, wherein the recommendation is based on a predicted confidence that one or more peripheral devices associated with a computing device successfully operate after the OS on the computing device is upgraded.

In another example, the method further includes categorizing the peripheral devices as critical or non-critical and basing the recommendation on the categorizing. In another example, the predicted confidence is generated using crowd-sourced real world data from a plurality of computing devices, in which the data describes whether or not peripheral devices successfully operate across an OS upgrade. In another example, the crowd-sourced real world data is used in a machine learning system that is operated as a virtuous loop.

Based on the foregoing, it may be appreciated that technologies for peripheral device support with a digital assistant for OS upgrades have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and is not be construed as limiting. Various modifications and changes may be made to the subject matter described herein without following the example embodiments and applications illustrated and described, and without departing from the true spirit and scope of the present invention, which is set forth in the following claims.

What is claimed:

1. One or more non-transitory computer-readable memory devices storing instructions which, when executed by one or more processors disposed in a computer server, cause the computer server to:
receive telemetry data from a plurality of computing devices from real world instances of a plurality of operating system (OS) upgrades with respective users of the plurality of computing devices, in which the telemetry data describes successes and failures of a plurality of peripheral devices to operate in the plurality of computing devices after installation of the plurality of operating system (OS) upgrades on the plurality of computing devices;
collect contextual data and user history of a computing device to determine a context in which to provide a post-OS upgrade recommendation;
implement a confidence model in a machine learning system configured to use one of a neural network, a decision tree graph or a Bayesian network and includes nodes that are weighted;
the nodes of the confidence model include source OS, target OS, peripheral device information and the computing device information, wherein data from source OS and target OS are given more weight and small variations in peripheral driver type is given less weight, including data from infrequently used peripheral devices are excluded when making the OS upgrade recommendation;
identify one or more peripheral devices associated with the computing device and generate a prediction by the confidence model using the received telemetry data and the determined context of the computing device with a confidence level for successful post-OS upgrade operation of the one or more identified peripheral devices after the OS upgrade installation of the associated computing device; and
communicate with a digital assistant instantiated on the computing device so that the digital assistant is enabled to provide a notification of an available OS upgrade of the computing device and a recommendation to a user based on the prediction for successful post-OS upgrade operation of the one or more identified peripheral devices;

reduce uncertainty in successful post-OS upgrade operations of the one or more identified peripheral devices in the determined context using the notification of the prediction with the confidence level based on the context.

2. The one or more non-transitory computer-readable memory devices of claim 1 in which the executed instructions cause the computer server to crowd-source telemetry data across a plurality of computing devices.

3. The one or more non-transitory computer-readable memory devices of claim 1 in which the prediction is expressed with a level of confidence.

4. The one or more non-transitory computer-readable memory devices of claim 1 in which the confidence model comprises at least one of neural network, decision tree graph, or Bayesian network.

5. The one or more non-transitory computer-readable memory devices of claim 1 in which the confidence model includes a plurality of nodes, the nodes including one or more of source OS, target OS, peripheral device driver name, peripheral device driver version, peripheral device manufacturer, or type of connection between the peripheral device and the computing device.

6. The one or more non-transitory computer-readable memory devices of claim 5 in which the nodes are weighted.

7. A computing device operable by a user, comprising:
one or more processors;
a user interface (UI) configured to interact with a user of the computing device;
and a hardware-based memory device storing computer-readable instructions which, when executed by the one or more processors, cause the computing device to:
receive telemetry data from a plurality of computing devices from real world instances of a plurality of operating system (OS) upgrades with respective users of the plurality of computing devices, in which the telemetry data describes successes and failures of a plurality of peripheral devices to operate in the plurality of computing devices after installation of the plurality of operating system (OS) upgrades on the plurality of computing devices;
collect contextual data and user history of a computing device to determine a context in which to provide a post-OS upgrade recommendation;
implement a confidence model in a machine learning system configured to use one of a neural network, a decision tree graph or a Bayesian network and includes nodes that are weighted;
the nodes of the confidence model include source OS, target OS, peripheral device information and the computing device information, wherein data from source OS and target OS are given more weight and small variations in peripheral driver type is given less weight, including data from infrequently used peripheral devices are excluded when making the OS upgrade recommendation;
identify one or more peripheral devices associated with the computing device and generate a prediction by the confidence model using the received telemetry data and the determined context of the computing device with a confidence level for successful post-OS upgrade operation of the one or more identified peripheral devices after the OS upgrade installation of the associated computing device; and
communicate with a digital assistant instantiated on the computing device so that the digital assistant is enabled to provide a notification of an available OS upgrade of the computing device and a recommendation to a user based on the prediction for successful post-OS upgrade operation of the one or more identified peripheral devices;
reduce uncertainty in successful post-OS upgrade operations of the one or more identified peripheral devices in the determined context using the notification of the prediction with the confidence level based on the context and provides a mitigation to a predicted failure of the one or more peripheral devices to correctly operate after OS upgrade installation.

8. The computing device of claim 7 in which the executed instructions further cause the computing device to identify the one or more peripheral devices when a predicted confidence of successful operation after the OS upgrade installation is below a predetermined level.

9. The computing device of claim 7 in which the executed instructions further cause the computing device to operate the digital assistant to provide a confidence level for successful operation after the OS upgrade installation for each of the one or more peripheral devices.

10. The computing device of claim 7 in which the executed instructions further cause the computing device to operate the digital assistant to provide an aggregated confidence level for successful operation after the OS upgrade installation across a plurality of peripheral devices.

11. The computing device of claim 7 in which the executed instructions further cause the computing device to maintain context awareness using data comprising one or more of time/date, location of the user or device, language, schedule, applications installed on the device, user preferences, user behaviors, user activities, stored contacts, call history, messaging history, browsing history, application usage history, device type, device capabilities, or communication network type.

12. The computing device of claim 7 in which the executed instructions further cause the computing device to receive an input from the user that expresses a minimum level of confidence for one or more peripheral devices as a condition to be met before the OS upgrade installation is performed.

13. The computing device of claim 7 in which the context awareness is further maintained by using sensor data collected by sensors on the computing device, the sensors including one or more of camera, accelerometer, location-awareness component, thermometer, altimeter, heart rate sensor, barometer, microphone, or proximity sensor.

14. The computing device of claim 7 in which automated actions comprise one or more of visiting a website or interacting with a search service to find information that pertains to the one or more peripheral devices having the predicted failure.

15. The computing device of claim 7 in which automated actions comprise collecting information from one or more knowledge base articles pertaining to the one or more peripheral devices having the predicted failure.

16. The computing device of claim 7 in which the digital assistant is further configured to interact with the user using language, graphics, or text messages to exchange information pertaining to the OS upgrade installation.

17. A method for providing a recommendation to install an operating system (OS) upgrade to a user of one or more computing devices, comprising:
configuring a digital assistant to
i) interact with a user of a computing device using at least one of voice, physical interaction, or sensed gesture, and ii) collect contextual data associated with the user;
monitoring the user's interactions with the computing device to create a user history;
using the contextual data and user history to determine a context in which to provide the recommendation; and
receive telemetry data from a plurality of computing devices from real world instances of a plurality of operating system (OS) upgrades with respective users of the plurality of computing devices, in which the telemetry data describes successes and failures of a plurality of peripheral devices to operate in the plurality of computing devices after installation of the plurality of operating system (OS) upgrades on the plurality of computing devices;
implement a confidence model in a machine learning system configured to use one of a neural network, a decision tree graph or a Bayesian network and includes nodes that are weighted;
the nodes of the confidence model include source OS, target OS, peripheral device information and the computing device information, wherein data from source OS and target OS are given more weight and small variations in peripheral driver type is given less weight, including data from infrequently used peripheral devices are excluded when making the OS upgrade recommendation;
identify one or more peripheral devices associated with the computing device and generate a prediction by the confidence model using the received telemetry data and the determined context of the computing device with a confidence level for successful post-OS upgrade operation of the one or more identified peripheral devices after the OS upgrade installation of the associated computing device; and
communicate with the digital assistant instantiated on the computing device so that the digital assistant is enabled to provide a notification of an available OS upgrade of the computing device and a recommendation to the user based on the prediction for successful post-OS upgrade operation of the one or more identified peripheral devices;
reduce uncertainty in successful post-OS upgrade operations of the one or more identified peripheral devices in the determined context using the notification of the prediction with the confidence level based on the context.

18. The method of claim 17 further including categorizing the peripheral devices as critical or non-critical and basing the recommendation on the categorizing.

19. The method of claim 17 in which the predicted confidence is generated using crowd-sourced real world data from a plurality of computing devices, in which the data describes whether or not peripheral devices successfully operate across an OS upgrade.

20. The method of claim 19 in which the crowd-sourced real world data is used in a machine learning system that is operated as a virtuous loop.

* * * * *